(12) United States Patent
Wu et al.

(10) Patent No.: US 8,488,181 B2
(45) Date of Patent: *Jul. 16, 2013

(54) PRESERVING USER APPLIED MARKINGS MADE TO A HARDCOPY ORIGINAL DOCUMENT

(75) Inventors: Wencheng Wu, Webster, NY (US); Mu Qiao, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 637 days.

This patent is subject to a terminal disclaimer.

(21) Appl. No.: 12/755,666

(22) Filed: Apr. 7, 2010

(65) Prior Publication Data

US 2011/0249299 A1 Oct. 13, 2011

(51) Int. Cl.
*G06K 15/00* (2006.01)
(52) U.S. Cl.
USPC .................. 358/1.18; 358/1.16; 358/3.26
(58) Field of Classification Search
USPC .................................. 358/1.16, 1.18, 3.26
See application file for complete search history.

(56) References Cited

U.S. PATENT DOCUMENTS

| | | | |
|---|---|---|---|
| 5,850,474 A | 12/1998 | Fan et al. | |
| 6,377,758 B1 | 4/2002 | OuYang et al. | |
| 7,272,333 B2 | 9/2007 | Mizes | |
| 7,295,349 B2 | 11/2007 | Mizes et al. | |
| 7,366,357 B2 | 4/2008 | Curry et al. | |
| 7,376,269 B2 * | 5/2008 | Klassen et al. | 382/167 |
| 7,382,507 B2 | 6/2008 | Wu | |
| 2002/0138476 A1 * | 9/2002 | Suwa et al. | 707/3 |
| 2003/0179409 A1 * | 9/2003 | Nishida | 358/2.1 |
| 2006/0288278 A1 | 12/2006 | Kobayashi | |
| 2007/0092140 A1 | 4/2007 | Handley | |
| 2008/0016078 A1 | 1/2008 | Karlsson et al. | |
| 2008/0050016 A1 | 2/2008 | Kawano et al. | |
| 2008/0148067 A1 * | 6/2008 | Sitrick et al. | 713/193 |
| 2008/0231909 A1 | 9/2008 | Nakamura et al. | |
| 2009/0265286 A1 | 10/2009 | Nagarajan | |
| 2012/0111940 A1 * | 5/2012 | Coomer et al. | 235/386 |

OTHER PUBLICATIONS

Brendan McCane, Edge Detection, Feb. 20, 2001, University of Otago, Dunedin, New Zealand.
Barbara Zitova and Jan Flusser, Image Registration Methods: A Survey, Pod Vodarenskou Vezi, Nov. 9, 2001, Institute of Information Theory and Automation, Prague, Czech Republic.

(Continued)

*Primary Examiner* — Twyler Haskins
*Assistant Examiner* — Fred Guillermety
(74) *Attorney, Agent, or Firm* — Philip E. Blair; Fleit Gibbons Gutman Bongini & Bianco P.L.

(57) ABSTRACT

What is disclosed is a novel system and method for identifying and removing print defects from an original document such that user markings applied to the hardcopy originally can be more readily identified and extracted. In one embodiment, an image of an original document and a marked document are received. The original document was printed using a print device which caused a print defect in the hardcopy print. Methods for identifying the print defect in the difference image are provided herein. The identified print defect is removed from the difference image. The difference image retains the user-applied markings once the print defects have been identified and removed. The user markings can then be provided to a storage device for subsequent retrieval and added into the image of the original document to generate an image of a new marked document containing the user markings without the defect. Various embodiments are disclosed.

20 Claims, 29 Drawing Sheets

OTHER PUBLICATIONS

Henry S. Baird and Michael A. Moll and Jean Nonnemaker and Matthew R. Casey and Don L. Delorenzo, Versatile Document Image Content Extraction, SPIE/IS&T Document Recognition & Retrieval XIII Conference, Jan. 2006, Lehigh University, Bethlehem, Pennsylvania.

Dashan Gao and Yizhou Wang and Haitham and Minh Do, Decompose Document Image Using Integer Linear Programming, ICDAR, Sep. 2007, University of Californiam Curitibia, Brazil.

Ugbeme, Onome, et al., "Automated Algorithm for the Identification of Artifacts in Mottled and Noisy Images," Journal of Electronic Imaging 16(3), 033015 (Jul.-Sep. 2007).

Ugbeme, Onome, et al., "An Automated Defect Classification Algorithm for Printed Documents," ICIS '06 International Congress of Imagng Science, FinalProgram and Proceedings.

Briggs, John C., et al., "Applications of ISO-1366, A New International Standard for Objective Print Quality Evaluation," Paper presented at Japan Hardcopy '99, Imaging Society of Japan, Jul. 21-23, 1999, Tokyo, Japan.

Chandu, K., et al., "A Mutual Information Based Automatic Registration and Analysis Algorithm for Defect Identification in Printed Documents," ICIP 2007, 1-4244-1437-7/07, 2007 IEEE.

Rosario, H.S., "A Novel Algorithm for Detecting Streaks in Mottled and Noisy Images," ICIS '06 International Congress of Imaging Science, Final Program and Proceedings.

Rao, K.R., et al., "Optimal Edge Detection Using Expansion Matching and Restoration," 0162-8828/94, 1994 IEEE.

Rosario, H.S., et al., "Streak Detection in Mottled and Noisy Images," Journal of Electronic Imaging, 043005-1, Oct.-Dec. 2007/ vol. 16(4).

U.S. Appl. No. 12/552,519, filed Sep. 2, 2009, Beilei Xu, et al.

U.S. Appl. No. 12/638,400, filed Dec. 15, 2009, Mu Qiao.

Modersitzki, J., "Numerical Methods for Image Registration," Oxford University Press, $1^{st}$ Ed. (Mar. 2004) ISBN-13:978-0198528418.

Haralick, R.M., et al., "Computer and Robot Vision," vol. II, Prentice Hall, (2002), ISBN-13:978-0201569438.

Marr, D., et al., "Theory of Edge Detection," Proceedings of the Royal Society London 207, pp. 187-217 (1980).

Goshtasby, A.A., "2-D and 3-D Image Registration: for Medical, Remote Sensing, and Industrial Applications," Wiley Interscience, $1^{st}$ Ed. (Mar. 2005), ISBN-13:978-0471649540.

International Print Quality Standard—ISO/IEC 13660:2001.

* cited by examiner

PRESERVING USER APPLIED MARKINGS MADE TO A HARDCOPY ORIGINAL DOCUMENT

CROSS REFERENCE TO RELATED APPLICATION

The present patent application is related to co-pending and commonly owned U.S. patent application Ser. No. 12/638,400, entitled: "Preserving User Applied Markings Made To A Hardcopy Original Document", the entire teachings of which are incorporated herein by reference.

TECHNICAL FIELD

The present invention is directed to systems and methods for preserving user markings made to a hardcopy of an original document.

BACKGROUND

In many business and government environments, a document such as a Power Point presentation or a Microsoft® Word Document is printed by the document's creator and circulated throughout the office to various managers, co-workers, engineers, scientists, etc., for comments, suggestions, modifications, and the like. Each user's comments are often provided back to the document's author in the form of handwritten markings made to the face their copy of the circulated original. In many businesses, government offices, law firms, and the like, it may be desirable to preserve such user-applied markings. In order to preserve these markings, typically the individual marked copies from each respective user are scanned into electronic form and stored as entire separate files along with the original. While this may seem like a straight-forward way to preserve this kind of information, in large office environments wherein many users regularly apply comments to their respective copies, storing scanned versions of each entire document to preserve such user-applied markings necessarily creates separate copies of the original document. This consumes more electronic storage space than is needed to preserve each respective user markings. Moreover, in many office environments, users such CEO's, CFO's, and senior management, want to review a document which has already been circulated which contains the various user-applied markings from their staff.

Methods for digitizing documents containing customer markings have arisen. Instead of digitizing the document (i.e. scan it and store it as is), the scanned file is processed with the knowledge of the original as discussed in U.S. patent application Ser. No. 12/638,400. Such methods general work well but, because image registration is not perfect, printer is not perfect, and sensor is not perfect, additional print defects may arise in the reprinted output. One such print defect, otherwise known as "edge burning", is caused when pixels around strong edges in the digital original are mislabeled as customer markings due to imperfect image registration. The mislabeled pixels may increase the size of the customer markings and, as such, degrade the reprint quality when the customer markings are added back into the digital original for reprint. For another example, in those cases where excessive print defects are present on the hardcopy along with the consumer's markings, such differences may be mistaken as customer markings. This can result in a loss of image quality in the reprint. For yet another example, where the sensor used to digitized the documents could introduce additional defects due to, for example, high frequency noises, moiré (beating with halftone structure in the hardcopy), local and global magnification distortion. etc. This can result in a loss of image quality in the reprint if such additional defects in the digitization are mistaken as customer markings.

Accordingly, what is needed in this art are increasingly sophisticated systems and methods which address the above-described shortcomings.

INCORPORATED REFERENCES

The following U.S. Patents, U.S. Patent Applications, and Publications are incorporated herein in their entirety by reference.

"Banding Defect Detection In Digital Imaging Systems" U.S. patent application Ser. No. 12/552,519, to Beilei Xu and Wencheng Wu.

"Method And System For Analyzing Imaging Problems", U.S. Pat. No. 6,377,758 to OuYang et al.

"Image Quality Measurements Using Linear Array In Specular Mode", U.S. Pat. No. 7,272,333 to Mizes.

"Systems And Methods For Compensating For Print Defects", U.S. Pat. No. 7,295,349 to Mizes et al.

"Image Quality Defect Detection From Image Quality Database", U.S. Pat. No. 7,382,507 to Wu.

"Systems And Methods For Detecting Image Quality Defects", U.S. Pat. No. 7,376,269 to Klassen et al.

"A Mutual Information Based Automatic Registration and Analysis Algorithm for Defect Identification in Printed Documents", Kartheek Chandu, Eli Saber, and Wencheng Wu, IEEE Int'l Conf. on Image Proc., Vol. 3, pp 449-452, (Sep. 16, 2007-Oct. 19, 2007).

"Edge Detection", Brendan McCane, COSC453—Vision, (Feb. 20, 2001).

"Versatile Document Image Content Extraction", Henry S. Baird, Michael A. Moll, Jean Nonnemaker, Matthew R. Casey, and Don L. Delorenzo, In Proc., SPIE/IS&T Document Recognition & Retrieval XIII Conf (January 2006).

"An Automated Defect Classifying Algorithm for Printed Documents", Onome Augustine Ugbeme, Eli Saber, Wencheng Wu, Int'l Congress of Imaging Science, pp 317-320 (2006).

"A New Algorithm For Streak Detection In Mottle And Noisy Images", Hector Santos, Eli Saber, and Wencheng Wu, Int'l Congress of Imaging Science, pp 668-671, (2006).

"Streak Detection In Mottled And Noisy Images", Hector Santos Rosario, Eli Saber, Wencheng Wu, and Kartheek Chandu, Journal of Electronic Imaging, Vol. 16, 043005 (2007).

"Automated Algorithm For The Identification Of Artifacts In Mottled And Noisy Images", Onome Augustine Ugbeme, Eli Saber, Wencheng Wu, and Kartheek Chandu, Journal of Electronic Imaging, Vol. 16, 033015 (2007).

"Image Registration Methods: A Survey", Barbara Zitova and Jan Flusser, Image and Vision Computing Vol. 21 pp. 977-1000 (2003).

"Numerical Methods for Image Registration", Jan Modersitzki (Author), Oxford University Press, $1^{st}$ Ed. (March 2004), ISBN-13: 978-0198528418.

"Computer and Robot Vision", Robert M. Haralick and Linda G. Shapiro, Vol. II, Prentice Hall, (2002), ISBN-13: 978-0201569438.

"Theory of Edge Detection", D. Marr and E. Hildreth, Proceedings of the Royal Society London 207, pp. 187-217 (1980).

"2-D and 3-D Image Registration: For Medical, Remote Sensing, and Industrial Applications", A. Ardeshir Goshtasby (Author), Wiley Interscience; 1st Ed. (March 2005), ISBN-13: 978-0471649540.

International Print Quality Standard—ISO/IEC 13660:2001. This standard specifies device-independent image quality metrics, measurement methods, and analytical procedures to describe the quality of output images from hardcopy devices and is applicable to human-readable documents composed of binary monochrome images produced from impact printers, non-impact printers, and copiers.

"Applications of ISO-13660, A New International Standard For Objective Print Quality Evaluation", John C. Briggs, Alice H. Klein, Ming-Kai Tse, ISJ Japan Hardcopy, Tokyo, Japan (Jul. 21-23, 1999).

BRIEF SUMMARY

What is disclosed is a novel system and method for preserving user markings which have been applied to an original document.

In one example embodiment, the present method involves the following. An image of an original document is received. The image of the original document can be received from any of: a storage device, a memory, a computer system, a network, and an image input device. Using an image input device such as, for example, a document scanning device, an image of a hardcopy print of the original document is received. The original document was printed using a print device which caused a print defect in the hardcopy print. The hardcopy print contains at least one marking which had been applied to the surface thereof by a user. Once the image of the hardcopy print of the original document and the image of the original document have been received, an image registration is performed on the two images. Image registration effectuates an alignment between the image of the hardcopy print and the image of the original document. The two aligned images are then compared such that differences between the two images can be identified. These differences are extracted from the image of the hardcopy print to obtain a difference image. The difference image is then analyzed to identify the print defect induced into the hardcopy print by the defective print device such that the user marking which had been applied to the hardcopy print can be isolated and retrieved. Methods for identifying the print defect in the difference image are provided herein. In one embodiment, suspected print defects in the print device used to produce the hardcopy print of the original document are identified and classified based upon defect type. The print defect classification is then used to differentiate the print defect from the user marking in the difference image such that the user marking can be isolated and retrieved from the difference image. The identified print defect is removed from the difference image. The difference image retains the user-applied markings once the print defects have been identified and removed. The user markings can then be provided to a storage device for subsequent retrieval and added into the image of the original document to generate an image of a new marked document containing the user markings without the print defects. The new marked document containing the user marking can then be printed or otherwise communicated to other consumer's of this document. In other embodiments hereof, the extracted user markings are displayed on a user interface for a user to review. The user can then use the user interface to edit, modify or deleted the user marking. The user interface can be used to select or identify regions of interest containing one or more of the user markings for the application of additional algorithms such as, for instance, OCR, can be applied to the selected regions of interest. Various embodiments have been disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
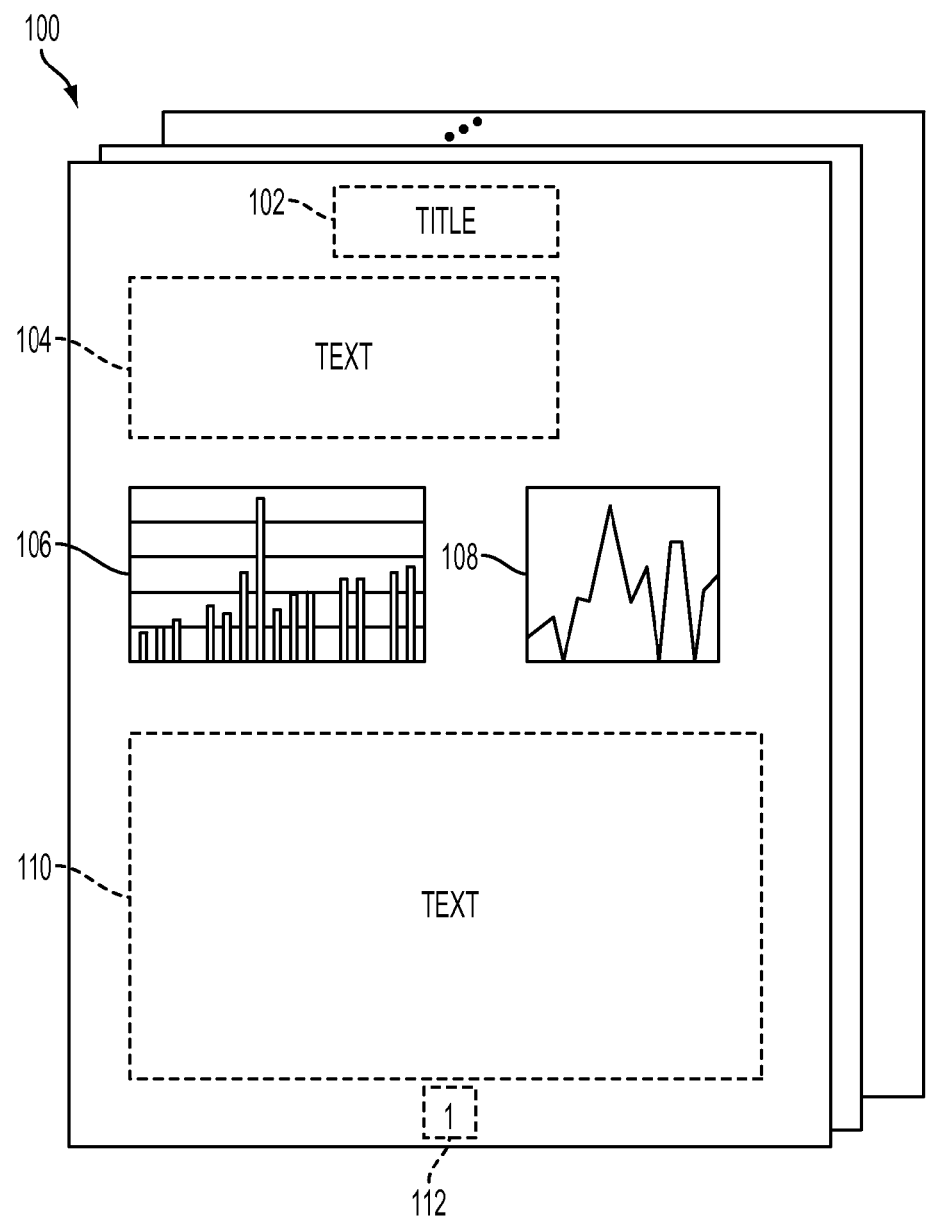
FIG. 1 shows an example plurality of original documents wherein various content objects have been embedded.

What is disclosed is a method for preserving user markings made to a hardcopy of an original document to improve print quality.

It should be understood that one of ordinary skill in this art would be readily familiar with many facets of identifying and extracting document content objects from an image of a document, and should be readily familiar with digital imaging quality monitoring, particularly those which are directly relate to detecting and quantifying banding within a digital imaging system's output, analysis of scanned images to determine banding within an imaging system's output, correlating observed banding to failures within or identification of required maintenance of an imaging system, and frequency analyses of image segments to obtain banding frequency data.

NON-LIMITING DEFINITIONS

A "pixel", as used herein, refers to the smallest segment into which a document image can be divided. Received pixels of a document image are associated with a value defined in terms of, for example, a color space, color, intensity, lightness, brightness, or a mathematical transformation thereof. Pixel values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

A "document object", or "embedded object" is separable content contained within a document. Various file formats, such as those employed by Microsoft® Office and Adobe® Acrobat, enable documents to act as containers. Example objects include text, graphics, pictures, plots, user markings, line art, or any combination or sub-combination thereof. Objects can be generally classified as follows: contone objects, text, line art, graphic, low frequency halftone objects, high frequency halftone objects, and solid fill objects. A monochrome contone object is an object or image comprising pixels having a range of shades corresponding to a single color, such as black toner (or ink). Color contone objects are objects comprising pixels having a range of shades corresponding to more than one color. In a CMYK color system, a color contone object or image may contain cyan and magenta toner (or ink). Monochrome text objects are text (e.g., alphanumeric characters in English or any other textual or character based representations) printed with pixels in a single color, usually black. Color text objects are text whose pixels are determined to use more than one color, such as green. Monochrome line art objects are line objects that are printed in a single color. Color line art objects are line objects printed using more than one color. Monochrome graphic objects are objects having a larger number of pixels of a single color arranged to form at least one edge defining a geometric shape. Color graphic objects have a large number of pixels in more than one color arranged to form at least one edge defining a geometric shape. The frequency of the pixels in an image determines if an object is "low frequency" or "high frequency." A monochrome low frequency halftone object is an object having a smaller number of pixels of halftone image data in a single color. A monochrome high frequency halftone object has a larger number of pixels of halftone image data in a single color. Color low frequency halftone objects have a smaller number of pixels of halftone image data in more than one color. Color high frequency halftone objects have a larger number of pixels of halftone image data in more than one color. An example color high frequency halftone object is color photograph. Solid fill objects are objects comprising a smaller number of pixels arranged to form a plurality of connected edges. Monochrome solid fill objects have a smaller number of pixels forming a plurality of connected edges in a single color. Color solid fill objects have a smaller number of pixels forming a plurality of connected edges in more than one color. A solid fill object may be an area with the same color throughout such as a solid color block, for example.

"Extracting an object" refers to isolating an embedded object sufficient to effectuate an identification and removal of that object from it's respective source document.

An "original document" is to a version of a document to which a user marking will be applied. An original document can be, for instance, a Word document, a Power Point presentation, an album of photos, a legal document such as a will, lease, contract, and the like, or a purchase order, invoice, or other documents common to various streams of commerce. An original document may or may not contain embedded objects. An example first page of an original document containing a plurality of embedded objects is shown and discussed with respect to FIGS. 1 and 3.

A "marked document" is an original document to which a user marking has been applied. An example marked document is shown and discussed with respect to FIGS. 2 and 4.

A "hardcopy of an original document" is an original document which has been reduced to a print using, for example, an image output device such as a color printer.

Figure 12:
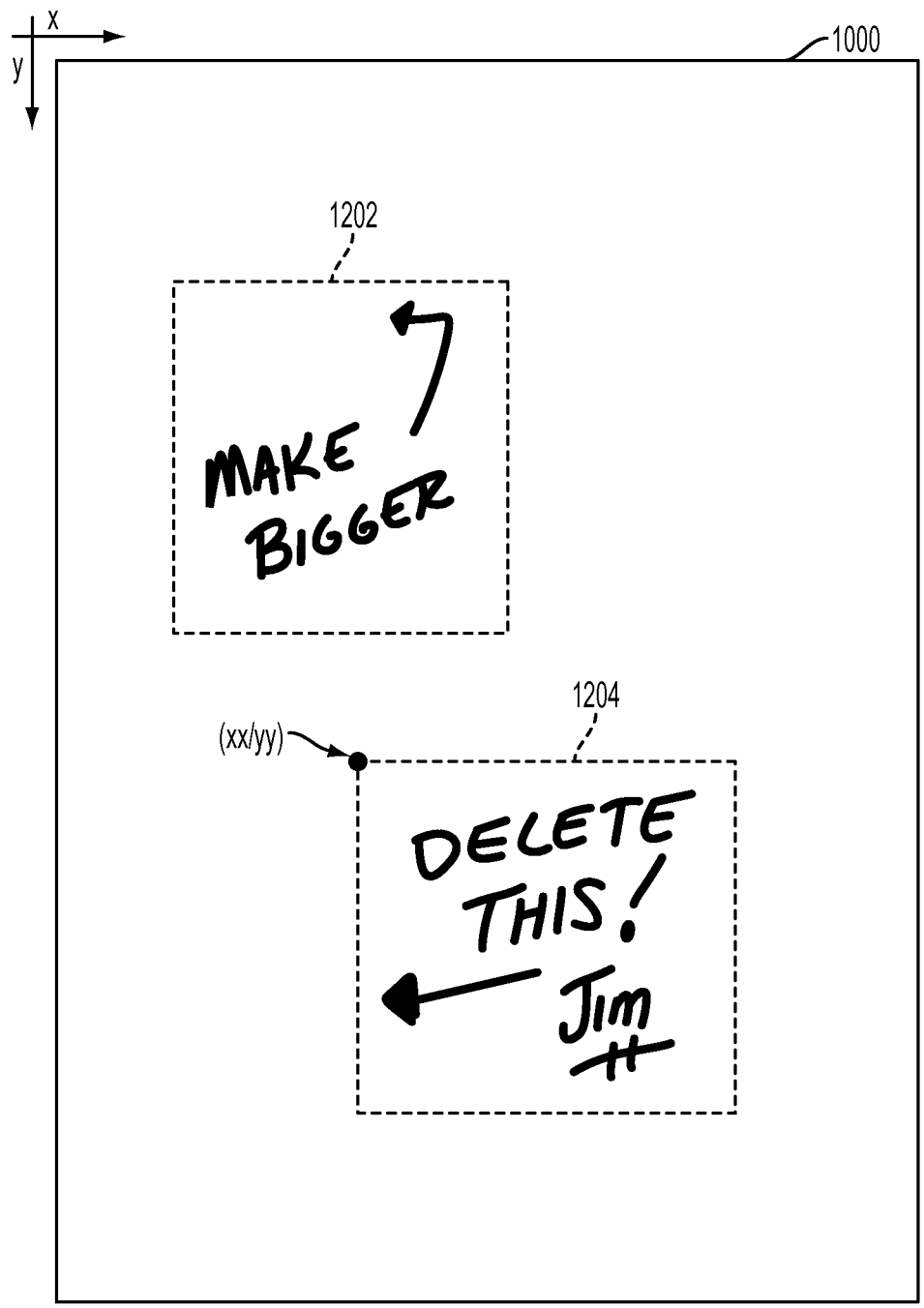
FIG. 12 show the example bitmap image of FIG. 10 wherein two identified user markings 1202 and 1204 with example rubber-band boxes having been draw around each by a user.

A "user marking" or "user-applied marking" refers to a marking made by a user to a hardcopy of an original document. Such markings may take the form of comments, notes, equations, symbols, figures, drawings, signatures, and the like. A user marking can be a handwritten marking made onto the original document or may be added to the original document by, for instance, taping an image to the original document, or stamping the original document with a rubber stamp having been wetted with ink. Example user markings in a bitmap of a single page are shown in FIG. 12 wherein each user marking is encompassed by a rubber-band box made by a user.

"Information about an original document" refers to any attribute which helps identify the original document such as, for example, title, author, date, and the like. Such information may also be attribute which identifies the original document file to a document editing software or a computer file system such as, for example, file time/date, file name, file size, file type such as PDF, WORD, TEXT, PPT, and the like, file folder, file location, and the like used to identify the original document. Any information, whether user-entered or obtained from an operating system, file system, or software program, which can be used to associate an extracted user marking with it's respective original document is intended to fall within this definition.

An "image of a document" or "document image" refers to an electronic version of a document (original or marked). An image of a document can be obtained by document designing software such as Microsoft® Word, Power Point, Adobe® PhotoShop, and the like. An electronic version, or digital presentation of a hardcopy print of a document, can also be obtained using, for example, a document scanner such as the scanning device 1402 of FIG. 14. Various embodiments of document image generating software or scanning devices generate a bitmap of a document image which corresponds bit-for-bit with the original image, and which is generally in a same format used in the display's video memory, or maybe in a device-independent bitmap. The bitmap is characterized by the width and height (X and Y dimensions) of the image in pixels and by the number of bits-per-pixel which defines a color depth, i.e., the number of colors a given pixel can represent. Generation of a document image is shown and discussed with respect to the functional overview of FIG. 5 and the example networked workstation of FIG. 15.

"Document decomposition" is a process of identifying and extracting embedded objects from a document image. Various document decomposition software tools recursively process document images. Such tools typically treat extracted objects as children of a parent document. Embedded objects may also have their own embedded objects thereby recursively supporting an infinite number of parent-child relationships.

"Image registration" is the process wherein two or more images of documents are overlaid, usually in a memory, to geometrically align the images. Image registration spatially transforms an image of a second document such that it substantially aligns with an image of a first document. Image registration methods are widely used in pattern recognition, artificial vision systems, and the medical image processing arts and can be implemented using a special purpose computer, such as the computer of FIG. 30, retrieving the digital images to be overlaid from memory 3008 and 3006.

A "print defect", as used herein, refers to objectionable anomaly introduced into a digitized hardcopy print of the original document by various components of a digital image system, a print device, or scanning device used to scan the hardcopy print to obtain a digital image thereof. These can also be a result of the print device or scanning device advancing the media too fast or too slowly. These can also be a result of the scanning device beating with the halftone structure of the hardcopy. Print defects may also arise as a result of an imperfect image registration process. It should be appreciated that the term 'print defect' is intended to encompass either a defect introduced into by the print device and/or a scan device. Print defects introduced into a hardcopy output print may take the form of either banding, graininess, mottle, streaking, deletion, moiré, etc.

"Banding" is a print defect which can occur in complex digital document reproduction system architectures. Banding consists of either horizontal or vertical bands, with a period that gradually varies from a minimum to a maximum value. Banding is often periodic and results from errors in the mechanical motion of rotating components, such as gears, pinions, and rollers in the charging and development subsystems, photoreceptors and their drive trains, or the ROS polygon, within a marking engine.

"Mottle" is a print defect comprising an irregular arrangement of patches of color on an output print due to defective toner transfer from the belt to the image forming surface.

"Graininess" is the a-periodic fluctuation of density at a spatial frequency, given in cycles per millimeter.

"Streaking" is a pseudo-random one-dimensional defect in an image that runs parallel to the process direction. Streaking-type defects might arise from a non-uniform LED imager, contamination of the high voltage elements in a charger, scratches in the photoreceptor surface, etc.

An "image input device" is a device capable of producing an image document. The set of image input devices is intended to encompass scanners, cameras, photography equipment, facsimile machines, and digital document reproduction devices. One example image input device that optically scans a document and converts the document into an image of the document is shown and discussed with respect to the scanning device 512 of FIG. 5 and document scanner 604 of FIG. 6. Another scanning device is shown at 1402 of FIG. 14. Common examples are variations of the flatbed scanner, widely known in the arts, wherein specialized receptors move beneath a clear platen and scan the face of the document placed on the platen. A digital signal of the scanned document is generated which, in various embodiments, contains information about pixels such as color value, intensity, location, and the like, which collectively provide a digital representation of the document scanned. Such devices may be in communication with computer systems and workstations, memory and storage devices, networked platforms such as servers and client devices, and other devices.

An "image output device" is any device capable of rendering an image of a document. The set of image output devices includes digital document reproduction equipment and other xerographic systems, photographic production and reproduction equipment, including a wide variety of marking devices as are known in the arts. One example image output device is shown and discussed with respect to the color marking device 504 of FIG. 5 and image output device 618 of FIG. 6. An inkjet printer is one example color marking device which renders an image from a received signal of the document image by the visual integration of color inks deposited onto a media. The term "rendering" is intended to be broadly interpreted. In one respect, rendering means reducing a signal of the document image to a viewable form. Rendering is also intended to mean storing the document image to a storage device, or to a repository of documents.

Example Original (Unmarked) Documents

Figure 2:
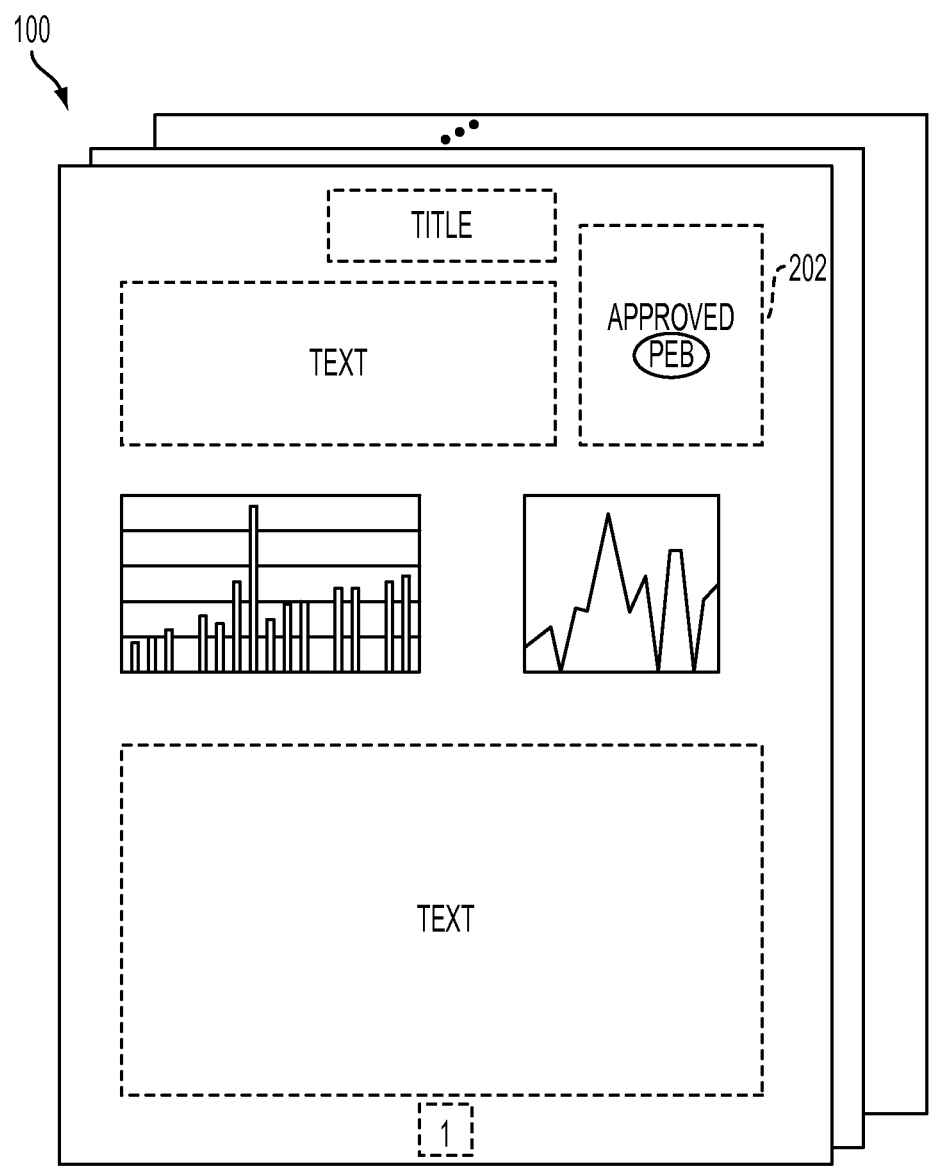
FIG. 2 shows the original documents of FIG. 1 whereon a user marking (at 202) has been applied to the upper right-hand corner of a first page.

Reference is now being made to the illustration of FIG. 1 which shows an example plurality of original documents 100 wherein various content objects have been embedded. The plurality of documents 100 of FIG. 1 are intended to represent example pages of an original multi-page document wherein various document content objects have been embedded. The dashed lines surrounding certain of the objects of the first page of the plurality of documents are for illustration purposes and are not intended to represent content. The embedded objects shown on the first page of the example original document are a title block 102, a first section of text 104, a first graphic 106, a second graphic 108, a second section of text 110, and a page number 112. Each of the remaining pages of the example plurality of documents 100 have their own respective embedded objects. FIG. 2 which shows an example first page of the marked document of FIG. 1 whereon a user has applied user marking 202 in the upper right corner of the page. The consumer of this document, for example, a manager or president of a company, has reviewed this document and wrote the word "APPROVED" with the initials "PEB" on the first page. The dashed lines surrounding the user marking 202 is for illustration purposes and does not represent consumer content.

Example Marked Document

Figure 3:
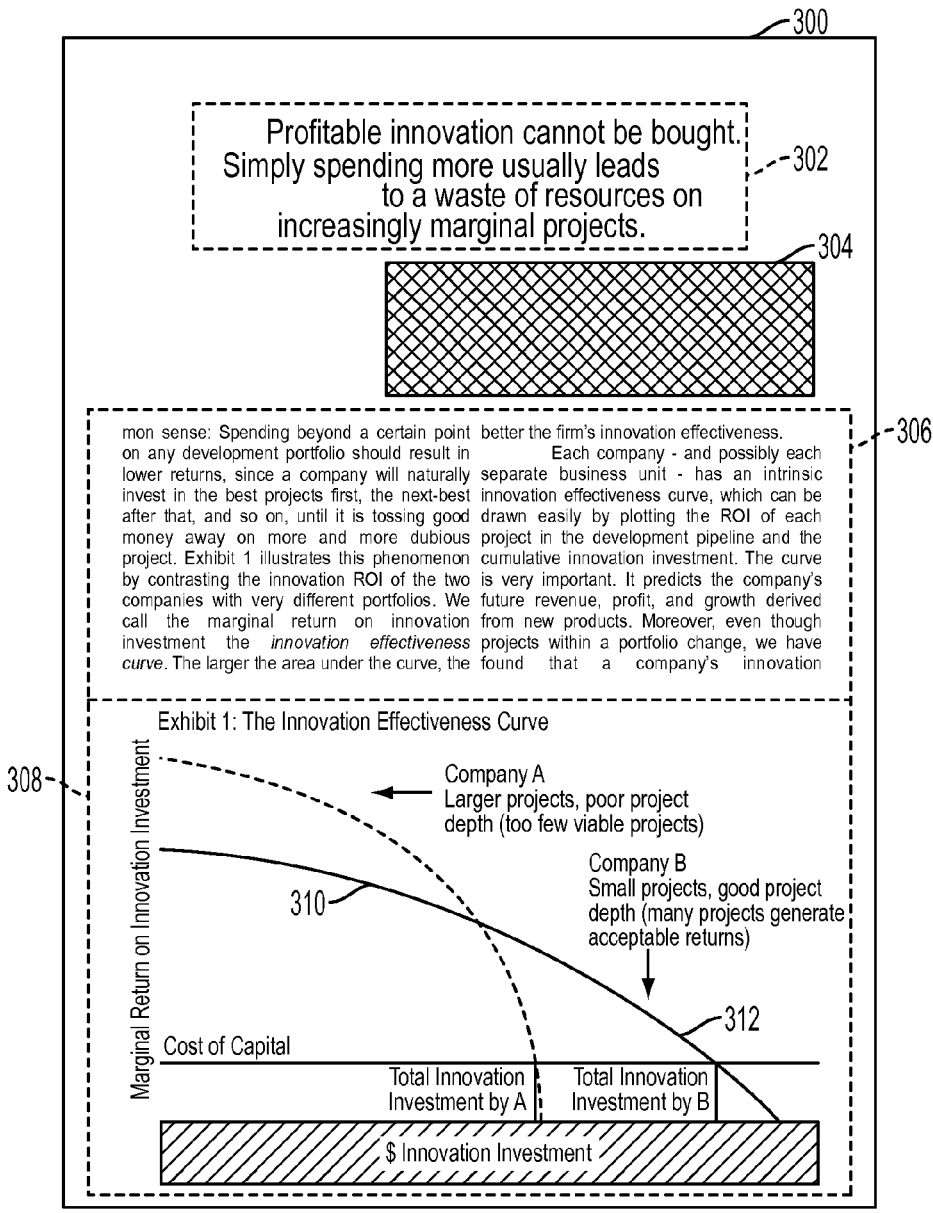
FIG. 3 shows yet another example original document with various content objects embedded therein.
Figure 4:
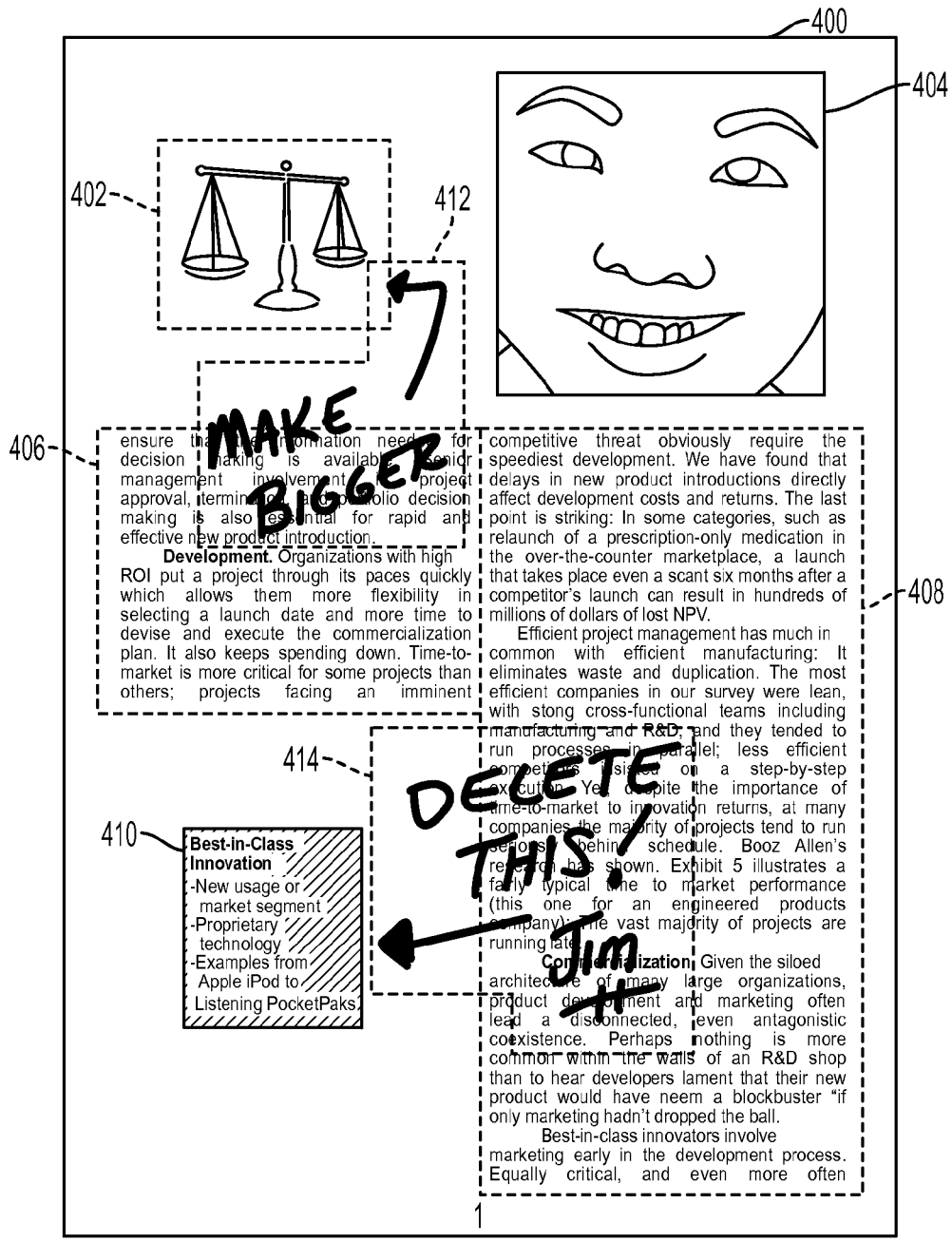
FIG. 4 shows yet another example marked document containing a first user marking (at 412) and a second user marking (at 414) having been applied.

Reference is now made to FIGS. 3 and 4 which illustrate examples of original documents with various object types contained therein. Page 300 includes text object 302, solid fill object 304, text object 306, graphic object 308 which has embedded therein color line art objects 310 and 312. Page 400 includes graphic object 402, high frequency halftone object 404, text objects 406 and 408, line object 410 which embeds low frequency halftone object 412. Also shown in FIG. 4 are two user markings. A first handwritten user marking at 412, shown encompassed by a dashed line, is an example user-applied comment that the art object 402 be made bigger. A second handwritten user marking at 414, also shown encompassed by a dashed line, recommends that the author delete the line object 410, for some reason. The user who applied this particular marking to the hardcopy of the circulated original document also wrote the name "JIM" as part of user marking 414. The first and second user markings (412 and 414 of FIG. 4) may not have been applied by the same user. For example, one manager may have made first user marking 412 and another manager may have made second user marking 414. It should be appreciated that the user markings, although shown in black/white, can be color markings having been applied by, for example, using a color marker or a color pen or pencil. These may further comprise pictures or graphics, for instance, which have been taped or otherwise fixed to the original document. Such fixed user markings may be, for instance, pictures, photos, charts, graphs, and the like, may further include additional user markings such as text, for example.

Functional Overview of Marked Document Generation

Figure 5:
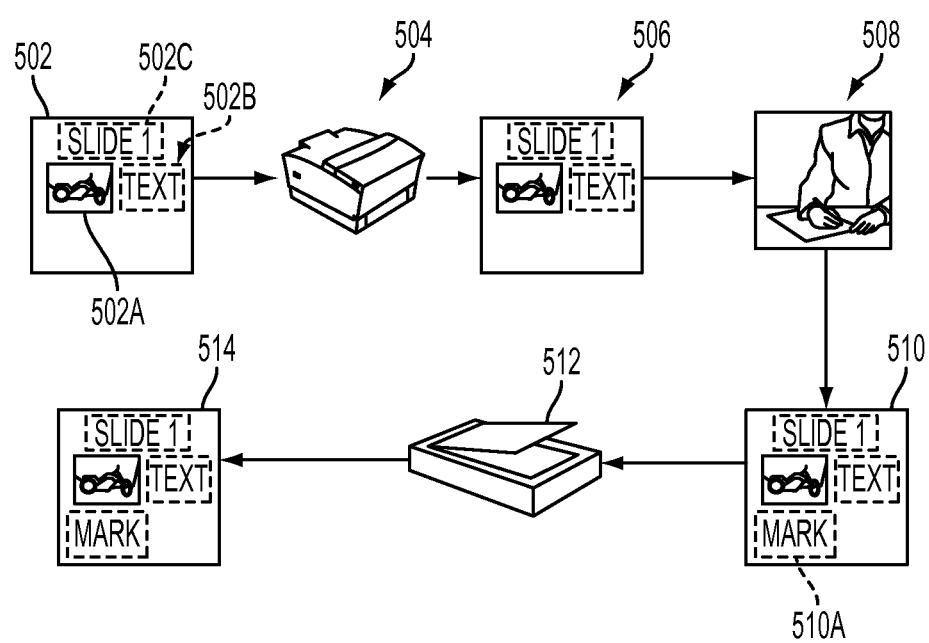
FIG. 5 is a block diagram providing a functional overview of an example process of generating a marked document.

Reference is now being made to the block diagram of FIG. 5 providing a functional overview of the generation of a marked document by a user applying a marking to the surface of a hardcopy print example electronic document 502. An electronic version of original document 502 (titled "SLIDE 1") has a plurality of embedded object content shown as photo object 502A, text object 502B, and title object 502C. The original document is created by a user using document creation software as are widely available in various streams of commerce. When printed using color marking device 504, a hardcopy 506 of original document 502 is created. A user applies a marking, shown generally at 508, to the surface of hardcopy original document 506 using, for instance, a marking pen. This produces marked document 510 with user marking 510A shown as the word "MARK". The word "MARK" is intended to represent a user-applied comment, for example. The marked 510 is scanned using document scanning device 512 to produce the image of marked document 514.

Example Networked System

Figure 6:
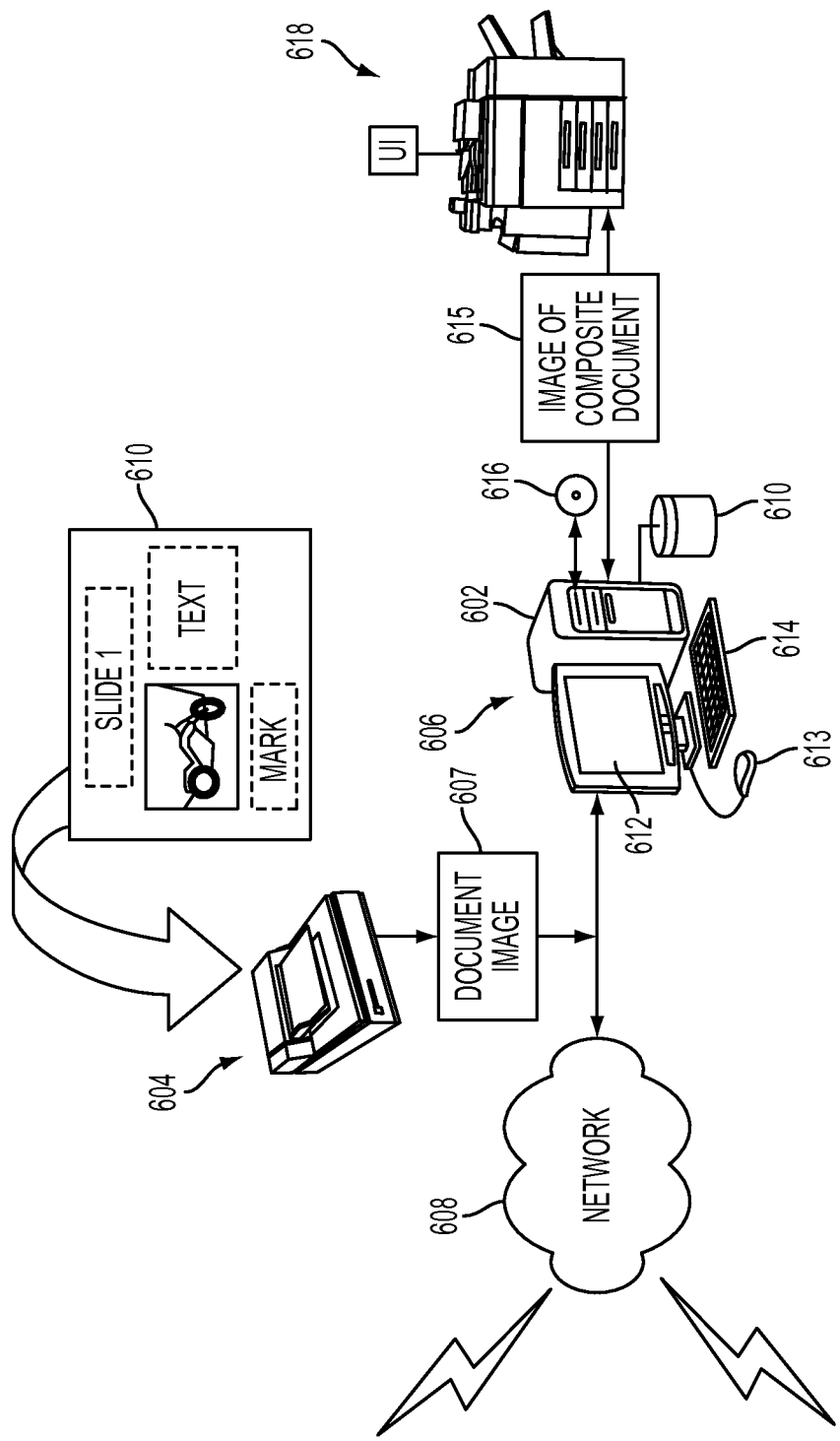
FIG. 6 illustrates one embodiment of an example networked system for performing the methods hereof described.

Reference is now being made to FIG. 6 which illustrates one embodiment of an example networked system for performing the methods hereof described with respect to the flow diagrams hereof. The document generation system converts a hardcopy marked document into an image of the marked document and provides that document image to a networked computer system in communication with an image output device. A hardcopy of the original document 506 is placed on the platen of image input device 604 and scanned to generate document image 607. In this instance, document image 607 is the image of the original document. In a similar manner, a hardcopy of marked document 510 is placed on the platen of image input device 604 and scanned to produce document image 607. In this instance, document image 607 is the image of the marked document. The process is repeated for each of the marked documents having user markings applied thereto. Any of document image 607 may be provided to computer system 606 in the form of signals received from a remote device placed in communication with computer system 606 via network 608. Further, any of document image 607 can be retrieved from memory or received from a remote device (not shown) via network 608. Computer system 606 may alternatively retrieve document image 607 (marked or original) from storage device 610. Storage device 610 may also store various extracted objects, user markings, object identifiers, file attributes, and the like, as part of records of objects such as those illustrated in FIG. 13. Computer system 606 is configured to perform any of the various aspects of the present method described with respect to the flow diagrams hereof. Computer system 606 includes a hard drive (internal to computer housing 602) which reads/writes to a machine readable media such as a floppy disk, optical disk, CD-ROM, DVC, magnetic tape, etc. Computer case 602 generally houses a motherboard with a processor and memory, a communications link such as a network card, video graphics card, and other software and hardware to perform the functionality of a computer system. The computer system further includes a graphical user interface which, in various embodiments, comprises display device 612 such as a CRT, LCD, touch-screen, and the like, mouse 613, keyboard 614, and removable storage media device 616. It should be appreciated that the computer workstation 606 has an operating system and other specialized software configured to display a wide variety of numeric values, text, scroll bars, dials, slideable bars, pull-down menus, selectable options, buttons, and the like, for entering, selecting, modifying, accepting any of the displayed information. The embodiment shown is only illustrative and may include any other functionality which any display device known in the arts is capable of displaying. The display device merely illustrates one example embodiment. Software to configure a user interface or any portion thereof to display/enter/accept data is highly customizable and may be device dependent. Such software is usually considered proprietary. Therefore, a further discussion regarding specific programming techniques and software algorithms to program or otherwise configure a display device to display a certain set of settings is omitted herein. One of ordinary skill would program their display portions for a specific system in a particular print/copy job environment. The computer system is capable of communicating with any number of computer systems, device, and document reproduction systems similarly connected to network 608. Identification information about any of the extracted user markings and information about the original or marked documents or about any of the extracted embedded objects can be entered by a user using the graphical user interface shown with computer system 606. File attributes about the original document can be obtained from the operating system of the computer system using standard software protocols. Any of the extracted user markings, objects, or any of the file identification information can be retrieved from storage device 610 and applied to the image of the original document to produce new composite marked document 615 containing the extracted user marking which can be stored, communicated over network 608, or rendered to a hardcopy print using image output device 618. Although shown as a generic desktop computer, it should be appreciated that the computer workstation 606 can be any of a laptop, mainframe, client/server, or a special purpose computer such as an ASIC, circuit board, dedicated processor, or the like. Computer system 606 may comprise any of the embodiments described with respect to the special purpose system of FIG. 30.

Extracted embedded objects, the extracted user markings, and any identification information about the extracted objects, original or marked documents or the user markings, can be processed, in accordance herewith, and stored using storage device 610. Any of the stored objects, files, and information may be communicated to another device via network 608 such as the Internet. Many aspects of the network, illustrated as an amorphous cloud, are known. As such, a detailed discussion as to the operation of the network or the configuration thereof has been omitted. Suffice it to say, data packets are transmitted by a network of special purpose servers connected via a plurality of communication links. Data is transferred in the form of signals which may be, for example, electrical, electronic, electro-magnetic, optical, or other signals. These signals are transmitted by wire, cable, fiber optic, phone line, cellular link, RF, satellite, or any other medium or communications link known in the arts. One computing device with access to the network communicates with another device with access to the network using well established network communication protocols.

Flow Diagram of Object Extraction

Figure 7:
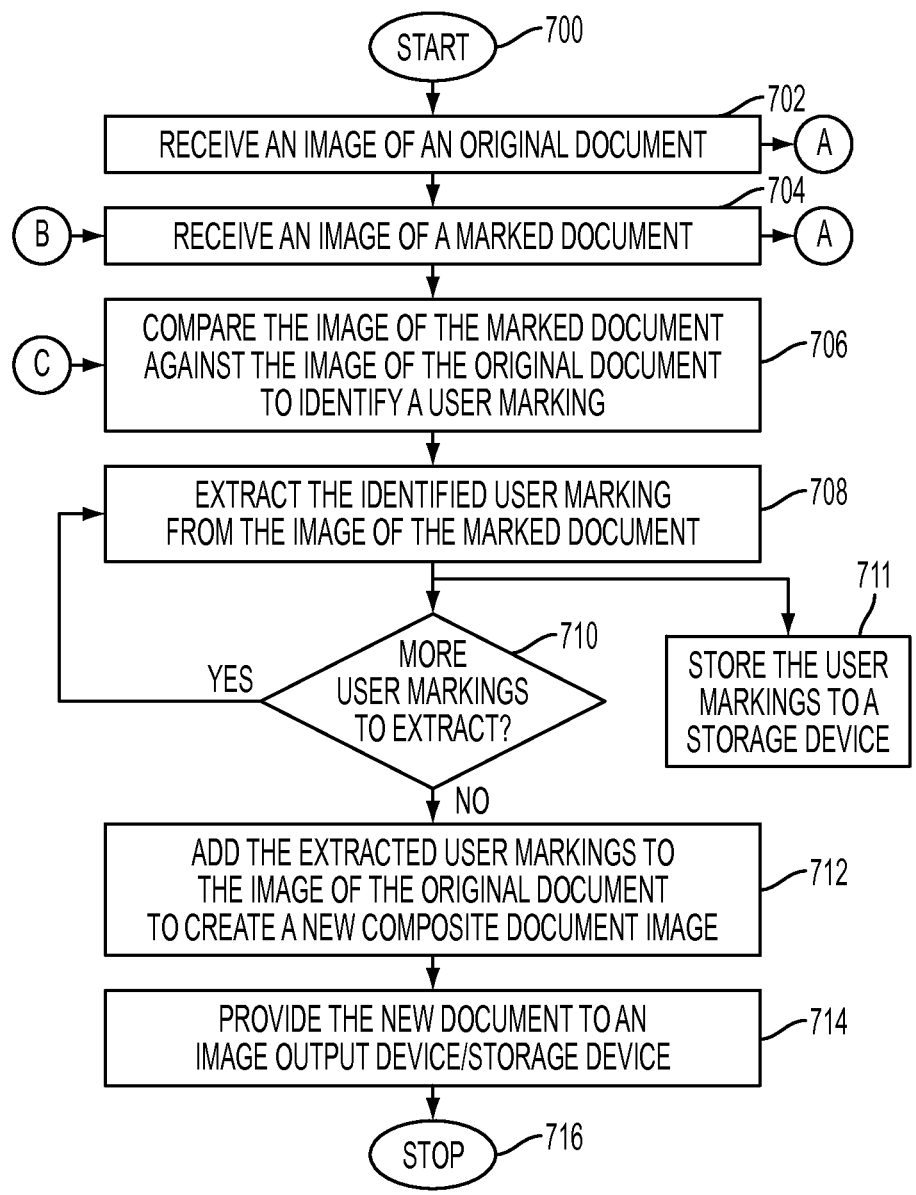
FIG. 7 illustrates one example embodiment of the present method for identifying and extracting user markings from an image of a marked document and for combining the extracted user markings into the image of the original document to generate a new composite document containing one or more of the extracted user markings.

Reference is now being made to the flow diagram of FIG. 7 which illustrates one example embodiment of the present method for identifying and extracting user markings from an image of a marked document and for combining the extracted user markings into the image of the original document to generate a new composite document containing one or more of the extracted user markings.

Figure 8:
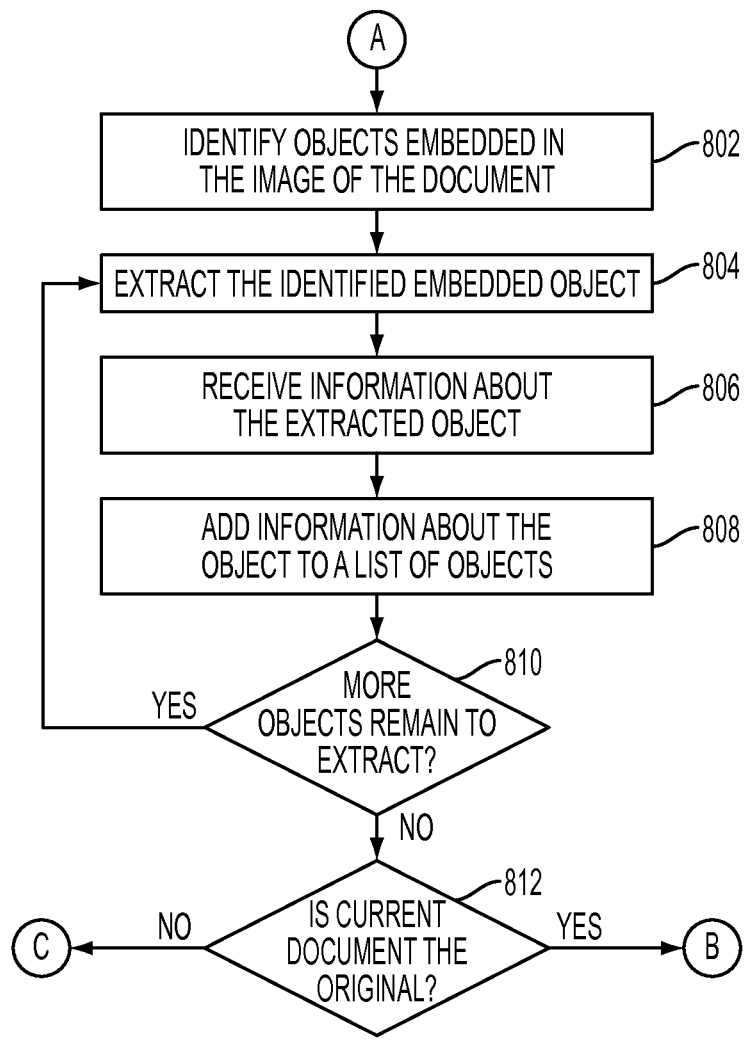
FIG. 8 is a continuation of the flow diagram of FIG. 7 with flow processing continuing with respect to node A to describe an embodiment wherein objects embedded in any of the original document image or the marked document image are extracted and stored.

Flow processing starts at 700 and immediately proceeds to step 702 wherein an image of an original document is received. The received original document may be the original document shown by way of example document image 506 of FIG. 5, which has been received using image input device 512 of FIG. 5. The image of the original document may be received over network 608 from a remote device. In one embodiment, the original document is unmarked, i.e., no user markings have yet been applied. The original document may comprise the new composite document generated hereby which, in turn, was reduced to a hardcopy print by an image output device, and which has further user markings applied thereto in a second-round of commenting on the circulated new composite document by various users. As will be discussed further herein with respect to the flow diagram of FIG. 8, alternative embodiments include extracting embedded objects from the image of the original document and saving the extracted objects to storage device 610 of FIG. 6. In FIG. 8, flow processing proceeds with respect to node A and returns with respect to node B of FIG. 7.

At step 704, receive an image of a marked document containing at least one user marking. The hardcopy marked document is shown by way of example marked document 400 of FIG. 4 or by way of the example marked document 510 of FIG. 5. The hardcopy marked document is converted to an image of the hardcopy document using an image input device such as document scanner 512 of FIG. 5. The image of the marked document can be received over network 608 of FIG. 6 or may be received from a remote device. The marked document comprises the original document with a user marking having been applied to the face of a hardcopy print of the original document. As will be discussed further herein with respect to the flow diagram of FIG. 8, alternative embodiments include extracting the identified embedded objects from the image of the marked document and storing the extracted objects to a storage device.

Figure 10:
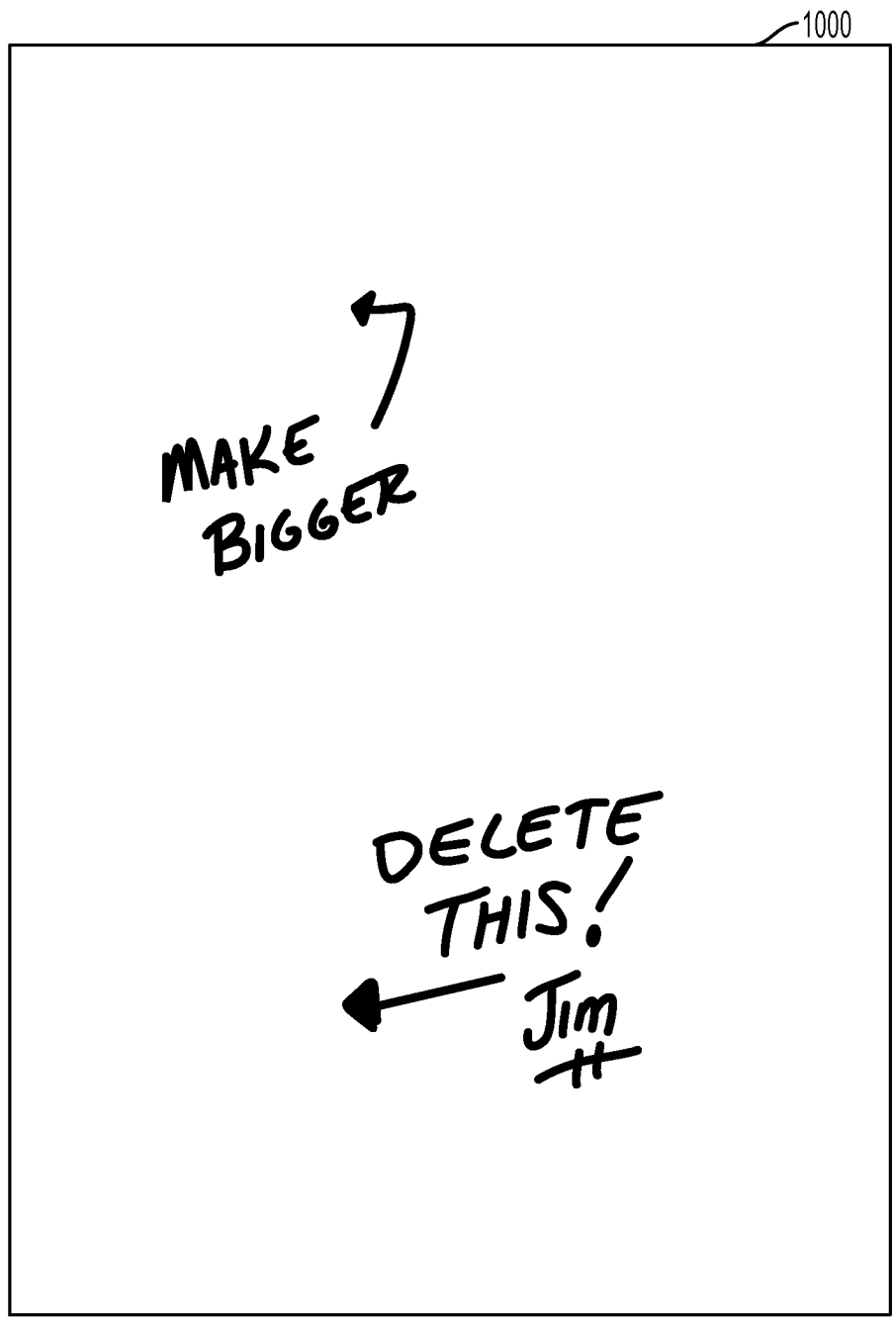
FIG. 10 shows an example bitmap of pixels in the image of marked document of FIG. 4 wherein user markings 412 and 414 have been identified.

At step 706, compare the image of the marked document against the image of the original document to identify a user marking in the image of the marked document. In various embodiments, image registration is first performed on the image of the original document and the image of the marked document to effectuate an alignment therebetween. As discussed above, image registration aligns two or more images such that the aligned images have a common geometric orientation. Such a process can be performed in the example computer system 606 of FIG. 6 by overlaying a bitmap of each received image. Once the two bitmaps are aligned, pixels of each bitmap can be digitally compared, either singularly on a row/column basis or in clusters, using for example a comparison method wherein pixel values in the bitmap are logically compared. As a result of this comparison, pixels determined to be exactly the same at a same location in both images producer a NULL pixel value at this location. Null pixels won't be printed. Such pixel locations are determined to be pixels which are common to both the image of the original document and the image of the marked document and thus do not comprise a user marking. More sophisticated pixel comparison methods determine that pixels at a same location in both images which are substantially similar, as determined by a pre-defined threshold, are determined to be pixels common to both images and thus do not comprise a user marking. Pixels found at a location in the image of the marked document which, at a same pixel location in the image of the original document, are determined to not be the same (or not substantially similar) are identified and retained. An example bitmap (or mask) created by the identification of pixels in the image of the marked document which were different than pixels at a same location in the image of the original document is shown in FIG. 10 wherein pixels of user markings 412 and 414 of FIG. 4 have been identified in pixel bitmap 1000 of FIG. 10. Upon completion of the pixel-by-pixel comparison of the two images, a bitmap is assembled using the retained information about identified pixels which are determined to be different. The bitmap created contains the identified user markings. The bitmap can be provided to a display, such as display 1103 of FIG. 11, wherein a user can crop the individual user markings from bitmap image 1000 of FIG. 10 using, for example, an image manipulation software tool as are common in commerce. The cropped user markings, at 1202 and 1204 of FIG. 12, of bitmap image 1000 can be stored to a record, such as any of those shown and discussed with respect to the embodiment of FIG. 13. Bitmap image 1000 of FIG. 10 can be stored to a storage device, either in whole or in part, along with information retained about the user markings such as, for example, pixel X/Y location in the bitmap image, pixel color values, and the like, is also stored. In another embodiment, the user markings in the image of the marked document are identified using document decomposition wherein embedded objects are identified in the image of the original document and embedded objects in the image of the marked document. The embedded objects may be extracted and stored or displayed on a display device. The objects identified in each of the document images are then compared. Objects which have been identified from the marked document which have not been identified in the original document are determined to be user markings. In yet another embodiment, a list of objects is created from embedded objects identified in the image of the original document. Embedded objects are identified in the image of the marked document and a list of objects in the marked document is created. The two lists of identified objects are compared. If an object identified in the marked document is on the list of original objects, then that object is not a user marking. Likewise, if an object is identified in the marked document which is not on the list of known original objects then that object is considered to be a user marking which was applied to the original document.

Figure 9:
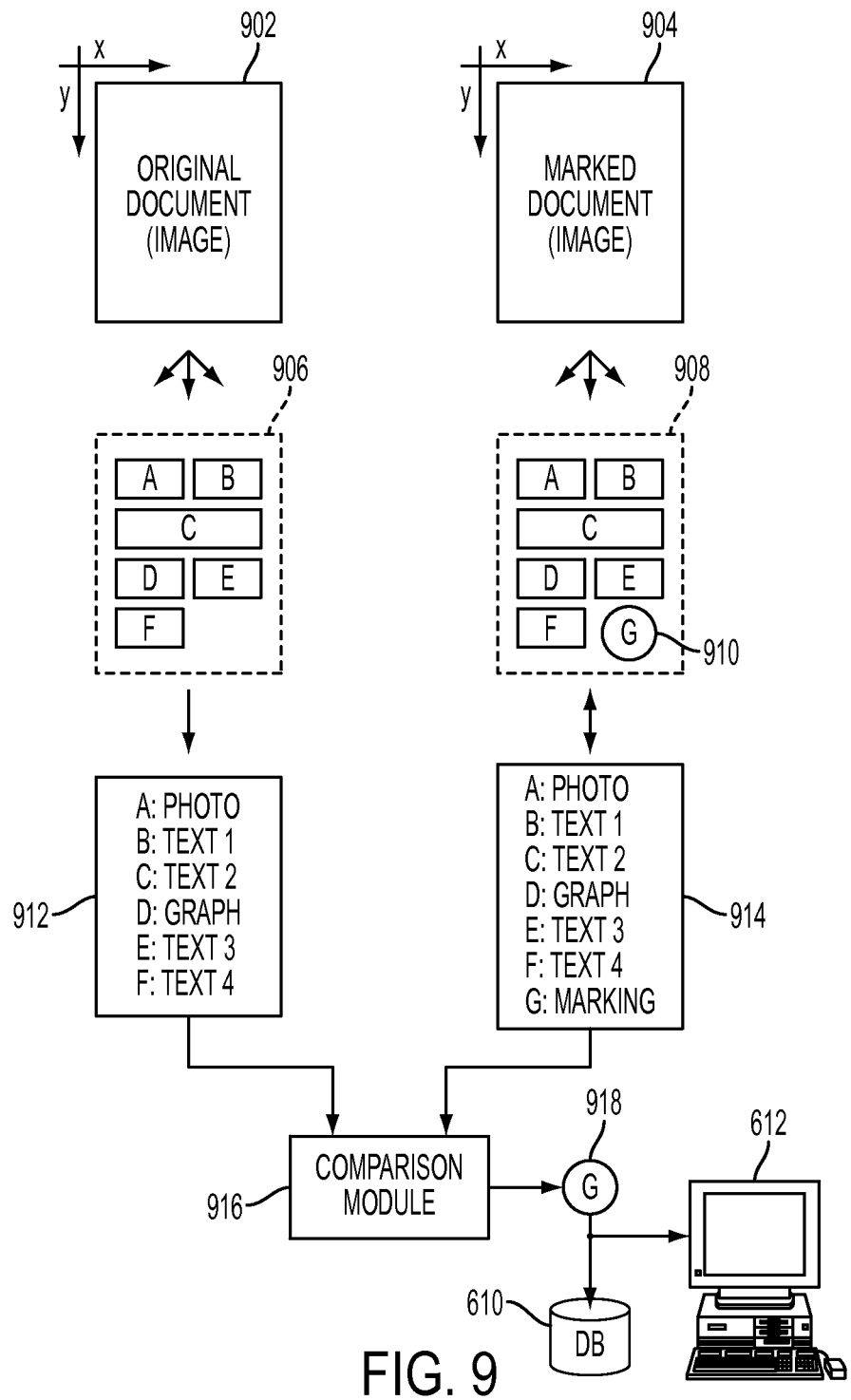
FIG. 9 shows an embodiment wherein an image of an original document and an image of a marked document are geometrically aligned to a common X/Y orientation and separable objects embedded, such as the embedded objects of the documents of FIGS. 1 and 2, contained therein are identified and a list of objects is created for each document image for object comparison purposes as described in various embodiments of the flow diagrams hereof.

Such an embodiment is shown in FIG. 9 wherein an image of an original document 902 and an image of a marked document 904 are geometrically aligned to a common orientation, shown as X/Y axis. Such an original document having identifiable separable objects embedded therein is shown in FIG. 1. A marked document having identifiable separable objects embedded therein is shown in FIG. 2. Embedded objects in the image of the original document 902 (each labeled A, B, C, D, E, and F) are identified 906 and can be further extracted and stored. Likewise, objects embedded in the image of the marked document 904 (each labeled A, B, C, D, E, F, and G) are identified 908 and can be further extracted and stored. Note that, in this example, embedded object "G" is the separate user marking 910 (shown at 202 of FIG. 2) which was applied to the hardcopy of the original document to create the marked document. A first list 912 of embedded objects which have been identified in the image of the original document 902 is created. In the example, object "A" is identified as a photo object because this object was a determined to comprise, for example, a JPEG image. Objects "B" and "C" were identified as being text objects because these two objects comprised primarily alphanumeric characters which, in turn, can be further processed by a character recognition software.

Object "D" was identified a line art object by any of its shape, form, composition, texture, or type, and objects "E" and "F" were identified as text objects. In this embodiment, a second list 914 is created from the objects identified at 908 in the image of the marked document 904. Since the marked document is a hardcopy of the original document having the user marking applied thereto, there will be substantial overlap between the identified objects. Thus, created list 914 comprises the same list of objects which were identified (at 906) in the image of the original document including object "G" which was also identified in the marked document. A comparison module 916 would then compare the objects in each of the lists to determine which objects were identified in the marked document which were not found in the list of objects identified in the image of the original document. Such a comparison module can reside as a hardware or software system within, for example, a computer system such as the example desktop computer 606 of FIG. 6. A comparison of the two lists shows that one object, labeled "G", was found in the image of the marked document which was not on the list of embedded objects in the image of the original document. Comparison module 916 provides the user marking (object "G") as an output. Such an output can be provided to storage device 610 or to display device 612 for a user identification.

Figure 11:
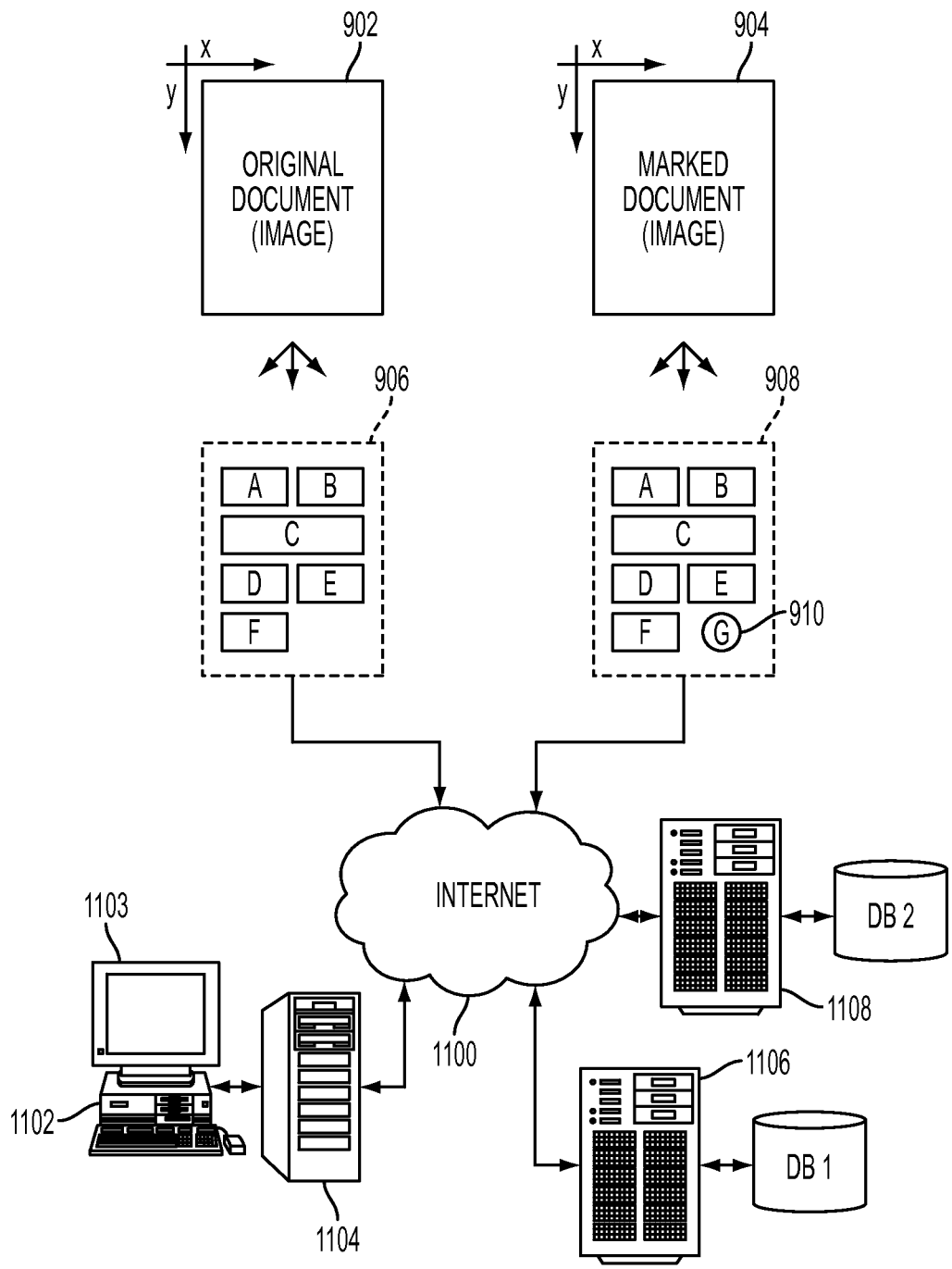
FIG. 11 illustrates an alternative to the embodiment of FIG. 9 wherein embedded objects identified in each of the image of the original document 906 and the image of the marked document 908 are communicated to system 102 over network 1100.

Any of the embedded objects identified in each of the image of the original document and the image of the marked document are extracted from their respective documents and provided to network 1100 of FIG. 11. Any of the identified objects, in whole or in part, along with any information associated with each user marking such that the extracted user markings (such as the markings cropped from image 1100 as shown in FIG. 12) can be communicated, stored, retrieved, and re-inserted back into an image of the original document at their original locations in the image. In the embodiment of FIG. 11, any of the identified objects and identified user markings is communication over network 1100 to server 1104 and provided to computer workstation 1102. Computer workstation 1102 displays any of the identified objects and any of the identified user markings on display device 1103, such as a monitor. The user, using the example graphical user interface associated with computer 1102, can provide identification information for each of the objects and user markings. In various embodiments, the user resizes, i.e., enlarges or reduces, any of the cropped user markings using image manipulation software tools having been pre-loaded onto computer 1102. Such user-provided identification information along with any of the user markings and objects (extracted or otherwise) can, in turn, be communicated over internet 1100 to example mainframe computers 1106 and 1108 for processing and stored in database DB-1 and DB-2, respectively.

With further reference again being made to the flow diagram of FIG. 7, at step 708, extract the identified user marking from the image of the marked document. Extraction of the identified user marking can be performed using well established document content object extraction techniques. Photos and graphs, for instance, can readily be extracted from an image of a document using edge detection methods. Text or blocks of text can be extracted from a region in a document using methods well known in the character recognition arts. The user marking can be extracted in a format which can be easily managed such as, for instance, text, JPEG, GIF, and the like. The extracted user marking can be further provided to a character recognition software which, depending on the legibility of the handwriting comprising the user marking, will convert the handwritten notes into alphanumeric characters. The extracted user marking can be stored, shown at step 711, as a record in a database of a storage device such as storage device 610 of FIG. 9. The extracted user marking can be communicated to a computer system and displayed on a graphical display device. The user can provide information and other comments about the extracted user marking which, in turn, will be stored with the user marking. Such information added by a user to a user marking may take the form of an identifying text string such as, for instance, "Jim's comment", or "(Steve 11-02-09)", or "From Engineering", or any information, textual or otherwise, which identifies one extracted user marking from another.

At step 710, a determination is made whether any more identified user markings need to be extracted. If so, then processing proceeds to step 708 wherein a next identified user marking is extracted from the marked document. Processing repeats until there are no more identified user markings to extract from the image of the marked document.

At step 712, add the extracted user marking into the image of the original document. Adding the extracted user marking into the image of the original document creates what is referred to herein as "a new composite document" image.

At step 714, provide the new composite document image to an image output device wherein the new document image is rendered. In various embodiments, the new composite document image is saved to a storage device. The new composite document image may be provided to a display device for a user review. The new composite document image may be communicated over a network, such as internet 1100 of FIG. 11, and provided to any of server 1104, or mainframe computers 1106 and 1108 and stored. Thereafter, further processing stops at 716.

Example Flow Diagram of Alternative Embodiment

Reference is now being made to the flow diagram of FIG. 8 which illustrates an embodiment hereof wherein objects identified in any of the image of the original document or the image of the marked document are extracted and stored. Flow processing proceeds with respect to node A.

At step 802, identify objects embedded in the received document image, either the image of the original documents received at step 702 of FIG. 7, or the image of the marked document received at step 704 of FIG. 7. Any of the document images can be received from the example computer system 606 via network 608. At step 804, the identified embedded object is extracted. Embedded objects are extracted using any of the image registration and document decomposition processes described with respect to the flow diagram of FIG. 7 and the various embodiments thereunder. The extracted objects may further be communicated to a computer system over a network and displayed on a display device for a user review.

At step 806, receive information about the extracted object. Such object identification information may include simple text strings such as "TEXT1", "PHOTO", "TEXT2", "GRAPH", and the like, as shown in the example list 912. In one embodiment, the extracted objects are displayed on a display device and object identification information is provided by a user using a graphical user interface. Such object identification information can be retrieved, in part, from the bitmap image itself such as pixel location in the bitmap wherein this object was found, pixel offsets from a reference location in the X/Y grid of the bitmap image, pixel color values, and the like. Object identification information is associated with the extracted object and stored with the object in a database of records of various objects identified and extracted from this particular document.

At step 808, add the object identification information to a list of objects. Such a list is shown and discussed with respect to list 912 and list 914 of FIG. 9. Such a list may include all the information known about a given object content or may simply include all or a portion of the object identification information and not include the object itself.

At step 810, a determination is made whether any more objects remain to be extracted in the document image currently being processed. If so, then processing repeats with respect to step 804 wherein a next identified object is extracted from the document image. Processing repeats for all objects in the document image. If, at step 810, there are no more objects to extract from the document image, then a determination is made whether the current document image being processed is the image of the original document. This step is performed such that the proper return node (B) or (C) of FIG. 8 can be identified. If the current document image is the image of the original document then flow processing proceeds with respect to node B of FIG. 7. Otherwise, the current document image being processed is the image of the marked document and flow processing proceeds with respect to node C of FIG. 7. Further processing thereof proceeds with respect to the example embodiment of FIG. 7, as discussed above. In such a manner, images of each of the original document and one or more images of marked documents are received. The received images are compared such that the user markings in each of the marked documents can be identified. The identified user markings are extracted and identification information associated therewith.

Various other embedded objects found within the image of the original document can also be identified and extracted. Identification information can also be associated with the extracted embedded objects and stored in a record. The extracted user markings can be selectively applied back into the image of the original document by a user using a graphical user interface and a new composite document created thereby. An example record of an object containing example identification information for any of an extracted object or an extracted user marking will next be discussed.

Example Plurality of Database Records

Figure 13:
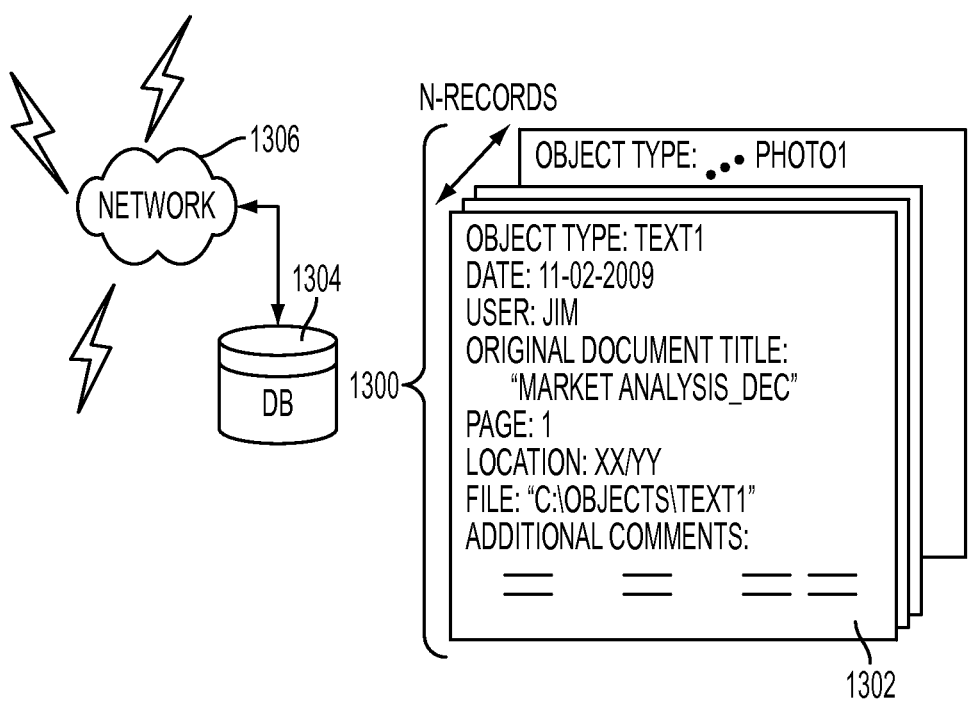
FIG. 13 illustrates a plurality of example records containing example identification information of user markings and/or objects extracted in accordance with the embodiments of the flow diagrams hereof.

Reference is now being made to FIG. 13 which illustrates a plurality of records containing identification information of any of a user marking or an extracted embedded object in accordance with the embodiments of the flow diagrams hereof.

Shown are a plurality of records, collectively at 1300, wherein a first record 1302 contains identification information having been entered by a user such as for example, user marking 1204 cropped from bitmap 1000 in a manner in accordance with the embodiment shown and discussed with respect to the flow diagrams hereof. It should be appreciated that the identification information, or any other information, contained in any of the example collection of records 1300 may be automatically generated and thus not requiring a user input. The example collection of records 1300 are stored in database 1304 which, in turn, is connected to network 1306. The network is intended to represent a communication connection with any of the computing devices of FIGS. 6 and 11. Database 1304 is capable of storing and retrieving records in response to a query. The database is also capable of adding new records, updating existing records, and providing retrieved records to a display device. Since database construction, query optimization, indexing methods, and record storage and retrieval techniques and algorithms are well known in the arts, a further discussion as to a specific database implementation is omitted. One of ordinary skill would be able to obtain a database from various vendors in commerce and place that database in communication with any of the illustrated computing devices. It should be appreciated that the database provided herewith for the storing and retrieval of records of objects and extracted user markings can be associated with any networked device. Whichever networked device the database is associated with on internet, it should be understood that information can be sent to any device connected to network. The illustrated database records are but one configuration.

Example object identification record 1302 is shown comprising a plurality of data fields which enable an extracted user marking to be associated with a particular location within a given page of a document from which it was extracted. For example, first record 1302 has an "Object Type" field. In this embodiment, the user marking is a text object (which can be further provided to a character recognition software). There is a "Date" field which can be any of, for example, the date the user marking was extracted, or the date that the user marking was applied to the hardcopy of the original document, or the date the original document was created. A timestamp field (not shown) can further be associated with a date field. Such time/date information can readily be extracted from the computing system used to extract the user marking in accordance with the teachings hereof. The 'User' field, in record 1302, shows that a user named "Jim" provided this particular extracted user marking being referred to by this particular record. There is also a "Original Document Title" field which, as it's name implies, refers to the title of the original document to which this particular marking is associated. A "Page" field refers to the number of the page in the original document which the associated user marking was applied. In this record, the extracted user marking (at 1204 of FIG. 12) associated with this record was retrieved from a first page of the original document of FIG. 4.

Also shown is a "Location" field. In this embodiment, the location field stores the coordinate location in the X/Y grid of bitmap 1000 wherein the upper left hand corner of object 1204 is positioned. Using the "Location" field information, this particular user marking can be placed back into the first page of an image of the original document at a same or substantially similar location from which it was extracted. Coordinate values shown as xx/yy, are illustrative and are intended to represent actual coordinate values which enable the placement of the extracted user marking (or extracted object) into the same page of the original document image from which it was extracted. The example record further has a "File" field which, in this embodiment, provides a location in a computer file system wherein the extracted user marking or object can be retrieved. In other embodiments, the extracted user marking or object is actually placed in the record in an easily manipulated format such as a JPG or TEXT, depending on the type of object it is. Sufficient information be provided with each identification record such that the associated user marking or object can be placed back into the original document from which it was extracted. The user marking is preferably placed in a same location within a same page of the original document but, since some or all of the fields of any of the records in database 1304 can be edited or otherwise modified by a user thereof, the various fields may be manipulated such that the associated user marking or object is placed at a different location on a different page, or even a different document, other than the original document from which it was retrieved. Lastly, the example record 1302 has an "Additional Comments" field wherein a user hereof, using a graphical user interface, may provide additional identification information that they want further associated with this particular user marking. In various embodiments, the field accepts alphanumeric characters of text entered via a standard keyboard having a QWERTY configuration.

It should be fully appreciated that user marking identification record 1302 is but one example and is intended for explanatory purposes. Other entries and record data fields may be used in addition to or in substitution for any of the fields shown in the example record(s) of FIG. 13. Pointers may be implemented which link the n-records together in a linked list, for instance. Such a linked list may comprise a doubly-linked list wherein one record points to a next record and a previous record, if one exists, using 'next' and 'prev' pointer fields in each of the records. A 'next' pointer in a last record in the linked list of records would contain a NULL field since there is no "next" record to point to. For a similar reason, the 'prev' pointer in the first record of the linked list of records would also contain a NULL field. Various implementations and embodiments hereof are intended to fall within the scope of the appended claims.

Example System for Preserving User Markings

Figure 14:
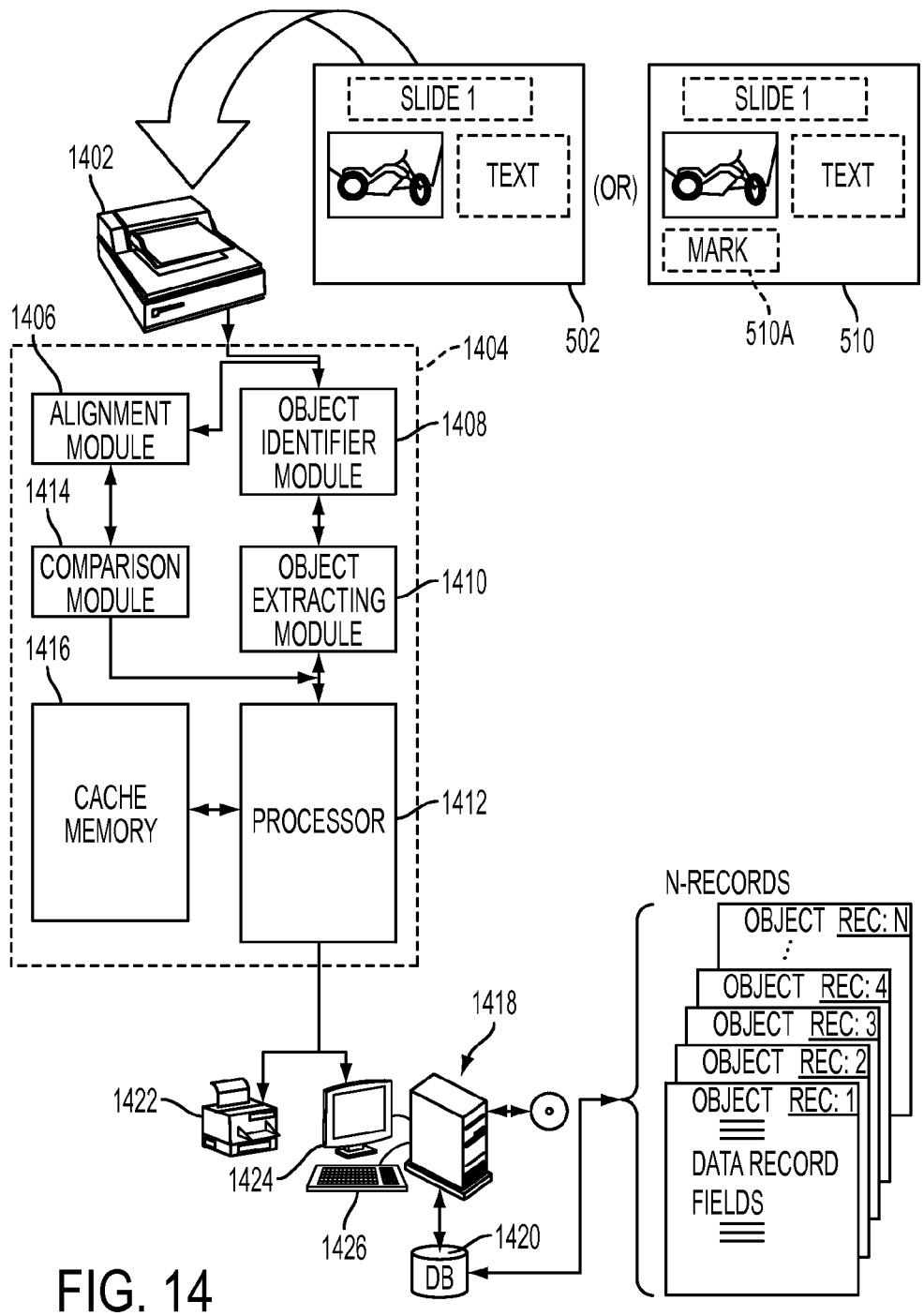
FIG. 14 illustrates one example system for performing various aspects of the present method for preserving user markings applied to a hardcopy print of an original document.

Reference is now being made to FIG. 14, which illustrates one example system for performing various aspects of the present method for preserving user markings which have been applied to a hardcopy print of an original document and for generating a new original document containing the user markings.

An example original document, such as original document 502, and an example marked document, such as marked document 510 containing user marking 510, are scanned using image input device 1402 to obtain an image of each of the original document and marked document. The respective document images are provided to document analysis and processing module 1404. Such a module can be a computer workstation configured to perform various aspects of any of the above-described embodiments, or may be a dedicated system, such as an ASIC or software system similarly configured. The image of the original document and the image of the scanned at least one marked document are provided to alignment module 1406 wherein, in this particular embodiment, an image registration is performed on the received images such that a common orientation is achieved therebetween. In one embodiment, an output of the alignment module comprises a bitmap of one document image overlaid on a bitmap of the other document image such that a pixel-by-pixel comparison can be effectuated. In another embodiment discussed with respect to the flow diagram of FIG. 8 wherein objects are identified and extracted from each of the original document and marked documents and a comparison made therebetween to effectuate a determination of the user markings contained within the image of the marked document, the scanned document images are provided directly to object identifier module 1408 which identifies content objects contained within the document image.

The identified objects are then provided to object extraction module 1410 wherein the identified embedded objects in any of the image of the original document or the image of the marked document are extracted. The output of the object extraction module comprises the extracted objects and any other object identification information which can be obtained from the document images from which that object was extracted. An output of alignment module 1406 is provided to comparison module 1414 wherein the overlaid images are compared, pixel-by-pixel, to obtain a bitmap of pixels which are found to reside in the image of the marked document but not within the image of the original document. The comparison module produces a bitmap of such difference pixels. Such a bitmap contains the user markings. One example bitmap is shown and discussed with respect to bitmap 1000 of FIG. 10.

Processor 1412 helps facilitate the functions performed and provides cache memory and processing throughput to the between the various modules. In other embodiments, processor 1412 executes a plurality of machine readable program instructions stored in cache memory 1416 for performing various aspects of any of the functionality of any of the modules shown in system 1404 and discussed with respect to the flow diagrams hereof. Processor 1404 is in further communication with computer system 1418 wherein the extracted objects, as shown in FIG. 9, and/or the bitmap image containing the user markings are further processed in accordance herewith. In one embodiment, the received extracted objects and/or the received bitmap are stored to storage device 1420. In another, any of the extracted objects received from object extraction module 1410 and/or the received bitmap are provided to image output device 1422 or displayed on display device 1424. In various embodiments, the user enters identification information using keyboard 1426 for any of the extracted embedded objects and/or any of the bitmap image. Any identification information may be automatically generated without a user input. Such identification information for one example record is shown and discussed with respect to record 1302 of FIG. 13.

Example Workstation for Record Retrieval

Figure 15:
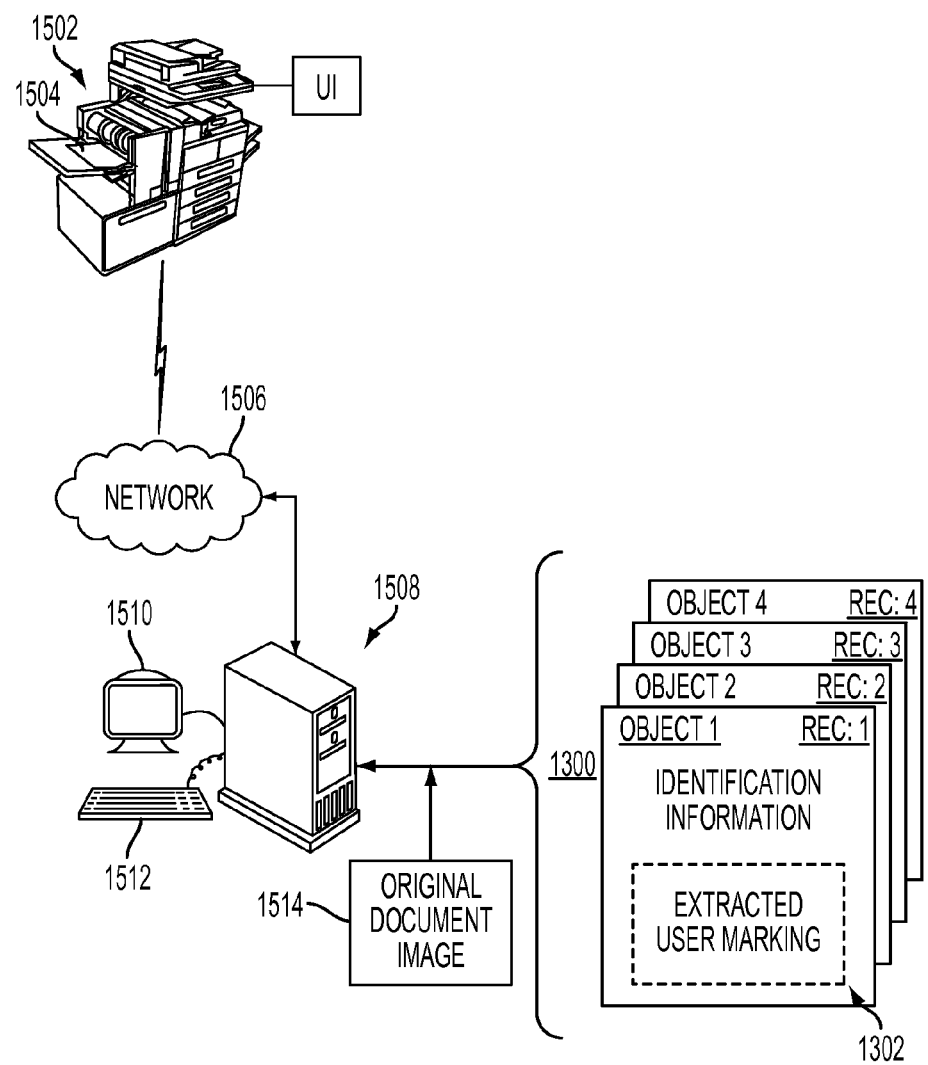
FIG. 15 illustrates an example system for retrieving at least some of the plurality of records of FIG. 13 and combining the user markings associated therewith with the image of the original document to produce new composite document 1504.

Reference is now being made to FIG. 15 which illustrates an example workstation system for retrieving at least some of the plurality of records and combining the user markings obtained from the retrieved records with image of the original document to produce new composite document. A plurality of records, shown collectively at 1300, have been created in accordance with the above-described embodiments and are further shown and discussed in detail with respect to FIG. 13. These records contain object identification information and, in this embodiment, an extracted user marking associated with the identification information. Although on a first record 1302 is shown, there are 4 records containing user markings and each of their respective object identification information. Such records are stored in a storage device (not shown) and are readily addressable by a central processing unit of workstation 1508 either directly or in response to a user query. An example workstation comprises a system which is further described with respect to the example special purpose computer of FIG. 30. An image of the original document also resides on the storage device and is retrieved by the workstation. An image of the marked document may further be stored therein along with any of the bitmaps, lists, objects, and other information which associates the user markings with their respective locations on a given page with the original document. Also stored in a storage device, internal to workstation 1508, are software tools for performing the comparisons of the image of the at least one marked documents with the image of the original document, in accordance herewith, to identify the user markings in the image of the marked document. Image manipulation software enables a user to view the bitmap image containing the user markings, such as the image of FIG. 10, on display device 1510 and crop the various user markings from the bitmap image and save the cropped markings, such as user markings 1202 and 1204 of FIG. 12, into records 1300 and provide user marking identification information via user interface 1512. Computer workstation retrieves original document image 1514 from the storage device and, in various embodiments, serially retrieves the stored records of user markings associated with this document image. In this example embodiment, the user marking contained in first record 1302 is retrieved along with any of the identification information for this first object, and displayed on graphical display device 1510 for review by a user. The user makes a decision whether this particular user marking is intended to be combined with the image of the original document to produce the new composite document. The user responds via keyboard 1512. If so, then this user marking is added to the corresponding page of the original document according to the location information retrieved from the first record associated with this first user marking object. Thereafter, a record of a next object (object 2) is retrieved from the plurality of records 1300. That user marking and the associated object identification information is next displayed for the user on display device 1510. Again, the user responds whether they desire this particular user marking to be combined into the image of the original document to produce the new composite document. The process repeats for each user marking object record associated with the image of the original document 1514. Thereafter, the new composite document containing the user markings having been added into the respective page locations in the image of the original document is communicated to image output device 1502 via network 1506 wherein the new document image 1504 is rendered. The new composite document may alternatively be stored to a storage device or communicated to a remote device over the network. In another embodiment, entire bitmap images, such as image 1000 of FIG. 10, are stored in an associated record and the entire bitmap is logically added into the associated page of the image of the original document. Such a logical addition of the bitmap of the user markings for a given page can be overlaid, on a pixel-by-pixel basis, for example, on to the corresponding page of the original document. In this embodiment, each successive retrieved bitmap of an entire page of user markings is added into the image of the original document at their respective page locations to produce the new composite document. Such alternative embodiments are intended to fall within the scope of the appended claims.

Any features or functions of any of the above-described systems, such as those systems discussed with respect to the embodiments of FIGS. 14 and 15, for example, may comprise, in whole or in part, a special purpose computer which includes a processor capable of executing machine readable program instructions for carrying out one or more aspects of the present method. Such a special purpose computer may comprise, for example, a micro-processor, micro-controller, device driver, an electronic circuit, or an ASIC designed to perform some or all of the methods hereof. Such a special purpose computer can be integrated, in whole or in part, with for example, a xerographic system, a color management system, an image processing system, or a digital front end (DFE). All or portions of the diagrams of the present system and method, as illustrated herein, may be implemented partially or fully in hardware in conjunction with machine executable instructions in communication with various components of such a system. The exact nature of the implementation will depend on the document processing environment wherein the present method finds its intended uses. One embodiment special purpose computer is shown and discussed with respect to FIG. 30.

Flow Diagram of Another Example Embodiment

Figure 16:
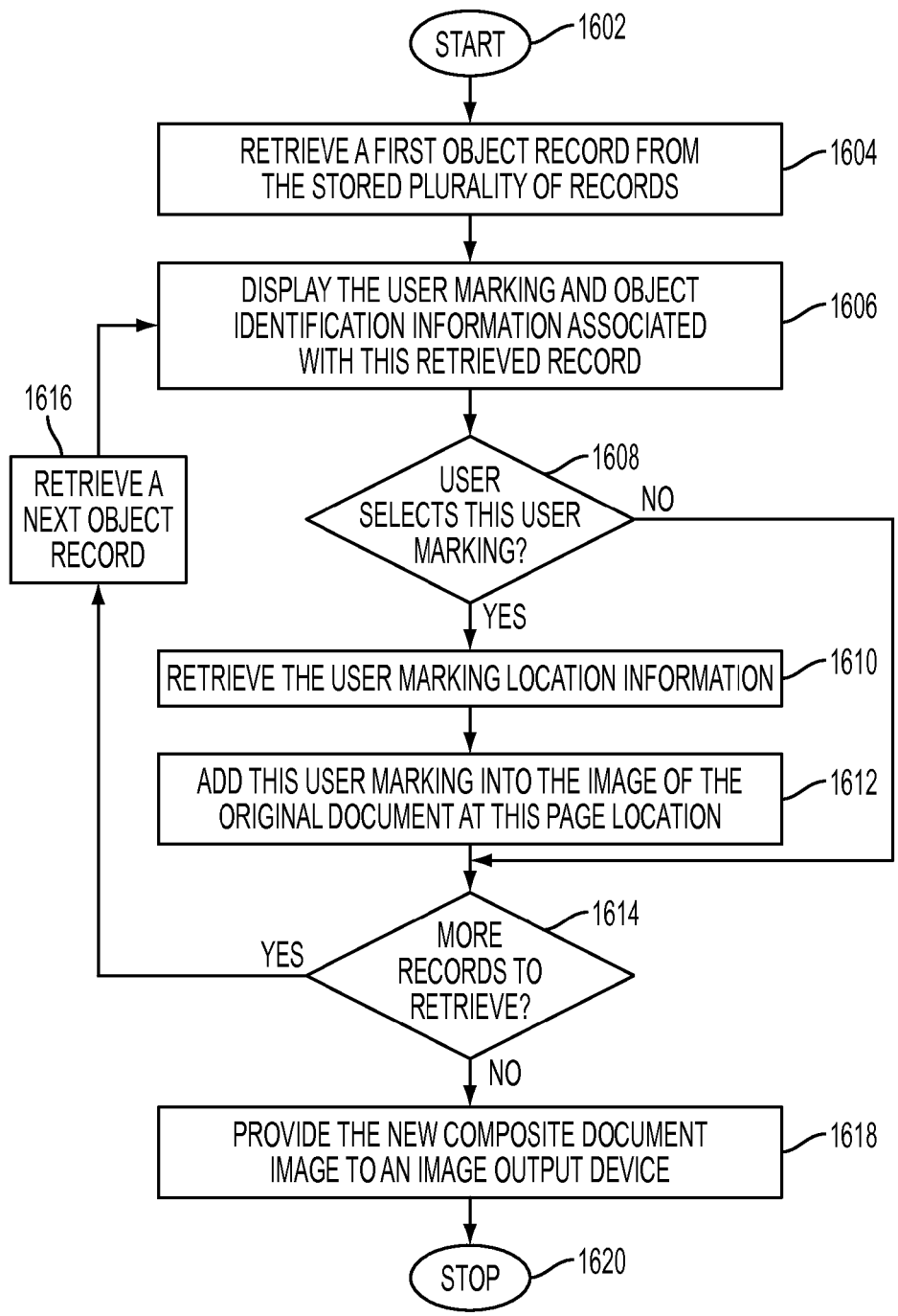
FIG. 16 is a flow diagram of one example embodiment of the present method for generating a new composite document in accordance with various embodiments hereof.

Reference is now being made to the flow diagram of FIG. 16 which illustrates one example embodiment of the present method for generating a new composite document in accordance with various embodiments hereof. Flow processing starts at 1602 and immediately proceeds to step 1604.

At step 1604, retrieve a first record from the stored plurality of records shown, for example, at 1302.

At step 1606, display the user marking and the object identification information associated with the first record object retrieved in step 1604 for a user review. Such a record would be displayed using the graphical display 1510 of the example computer workstation 1508.

At step 1608, a determination is made whether a user desires the displayed user marking to be included in the new composite document. If the user desires this user marking to be included in the new composite document then, at step 1610, the location information associated with this particular user marking is retrieved from the associated record. Such location information enables this user marking to be placed onto its respective page location in the image of the original document 1514. If the user does not desire this user marking, for whatever the reason, to be included in the new composite document intended to be generated, then processing proceeds with respect to step 1614 discuss herein further.

At step 1612, add this user marking into the image of the original document at the retrieved respective page location. The page location includes, for example, the xx/yy starting locations in the corresponding page of the original document as shown associated with user marking 1204. In the embodiment wherein an entire bitmap stored in a given record or otherwise associated therewith comprises an entire bitmap page of user markings, as shown in FIG. 12, then this entire bitmap page would be overlaid, pixel-by-pixel, with the corresponding page in the original document to produce a respective page of the new composite document. In those computing environments where storage space is not limited or is otherwise not a concern, entire pages of bitmaps of user markings may be stored in a given record. However, if storage space is a constraint, only the extracted user markings (1202 and 1204, for example) are stored in a given record.

At step 1614, a determination is made whether there are any more records of user marking objects which need to be considered. If so then processing proceeds with respect to step 1616 wherein a record of a next object is retrieved and processing proceeds thereafter with respect to step 1606. Otherwise, if there are now more records to be processed in accordance herewith, then all desired user markings have been added into the image of the original document at their respective page locations and the new composite document is complete.

At step 1618, provide the new composite document image to an image output device, such as document reproduction device 1502 of FIG. 15, wherein the new composite document containing the user markings extracted from each of the at least one marked documents is reduced to a hardcopy print 1504 of FIG. 15. Thereafter, processing stops at 1620.

It should be understood that the hardcopy print of the new composite document, which now contains selected user markings from one or more consumers of the original document may, in turn, be circulated again for a second round of commenting wherein additional user markings may further be added. In this instance, the new composite document becomes the original document, user markings applied to the circulated new composite document produce the various marked documents, and the above-described processes are repeated again for the "new" original document. Such additional user markings may be combined with any of the user markings extracted from the previous circulated version of the document and stored in a similar manner. Such additional markings may be crossed-out by a subsequent user such as, for instance, a senior manager who desires that a user marking not be included in a subsequent revision of the document. User markings which are not intended to be included in a subsequent revision of the circulated document may have their associated object records deleted from the database of records or otherwise flagged therein that this user marking is no longer desirable and should not be included when a next new composite document is generated. The above-described process may be repeated multiple times. Various alternatives and embodiments hereof are intended to fall within the scope of the appended claims.

Flow Diagram of Another Example Embodiment

Figure 17:
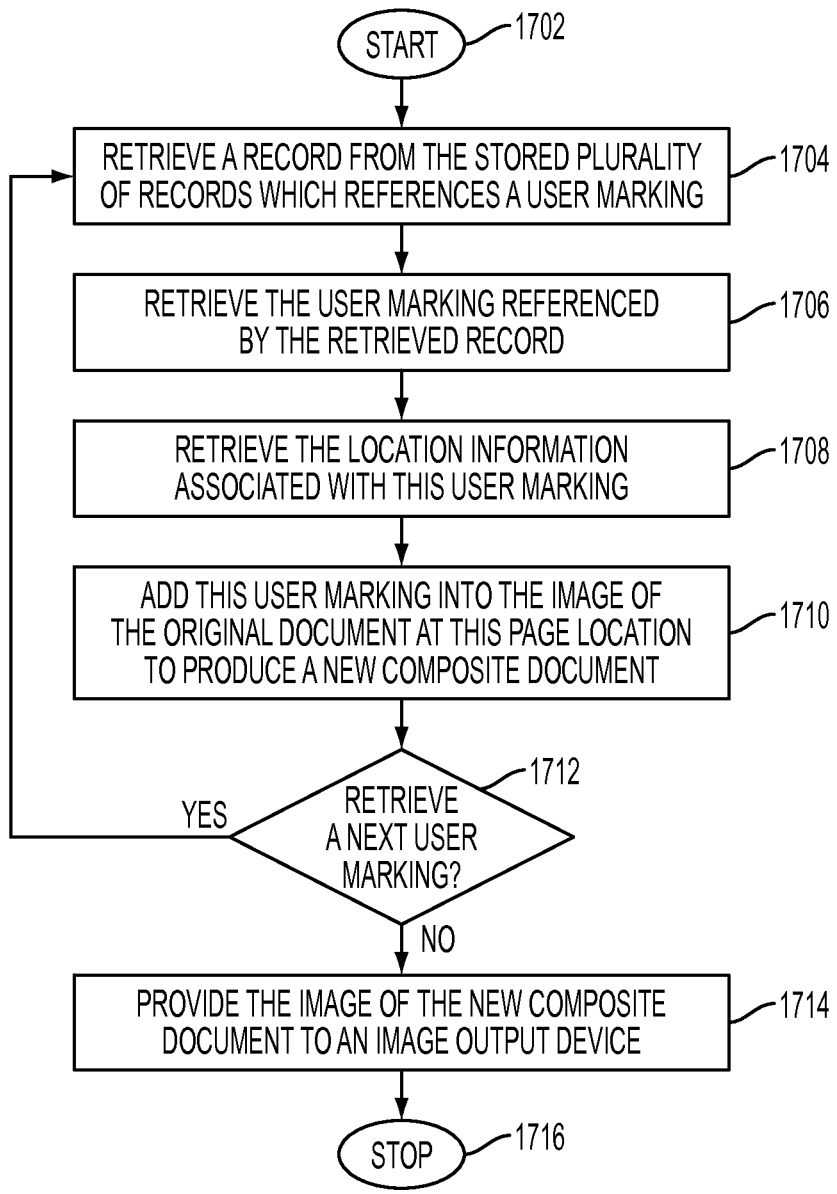
FIG. 17 is a flow diagram of another embodiment of the present method for generating a new composite document wherein the user markings are added back into the image of the original document automatically without a user intervention.

Reference is now being made to the flow diagram of FIG. 17 which illustrates another embodiment of the present method for generating a new composite document wherein the user markings are added back into the image of the original document automatically without a user intervention. Flow processing starts at 1702 and immediately proceeds to step 1704.

At step 1704, retrieve a record of a user marking from the plurality of stored records of user markings. The record may physically contain the extracted user marking or may reference the user marking or otherwise point to its location in a storage device or over a network. At step 1706, retrieve the user marking referenced by the record retrieved in step 1704. At step 1708, retrieve the location information associated with the user marking retrieved in step 1706. The location information for the associated user marking provides page location information in the image of the original document wherein this marking is to be added. At step 1710, add this user marking into the image of the original document using the retrieved page location information. Adding one or more user markings to the image of the original document creates a new composite document. At step 1712, a determination is made whether to retrieve a next user marking. If so, then processing proceeds back to step 1704 wherein a next user marking is retrieved. Processing repeats in an iterative manner until all user markings have been automatically retrieved without requiring a user intervention. At step 1714, after all the user markings have been retrieved and added into the image of the original document and the new composite document containing all the added user markings is now complete, the image of the new composite document is provided to an image output device wherein the new composite document is rendered. Thereafter, processing stops at 1716.

In further embodiments, a plurality of enhancements are made to various of the above-described embodiments. Edge removal differentiates between customer's markings from mislabeled edge pixels in the digital original due to imperfect image registration. An expanded edge map computed from the digital original to perform such exclusions. A print defect classification differentiates between customer's markings from suspected print defects. As an example of print defect classification, the print defect classification uses banding defect detection in conjunction with segmentations on the detected consumer's markings to identify mislabeled pixels due to banding defects. A post-processing module, i.e., a mark-up to text/graphic conversion module, is also disclosed which further effectuates processing of the user markings via graphical representation. Such a post-processing module can be either automatic, semi-automatic, manual, or a hybrid thereof.

Figure 18:
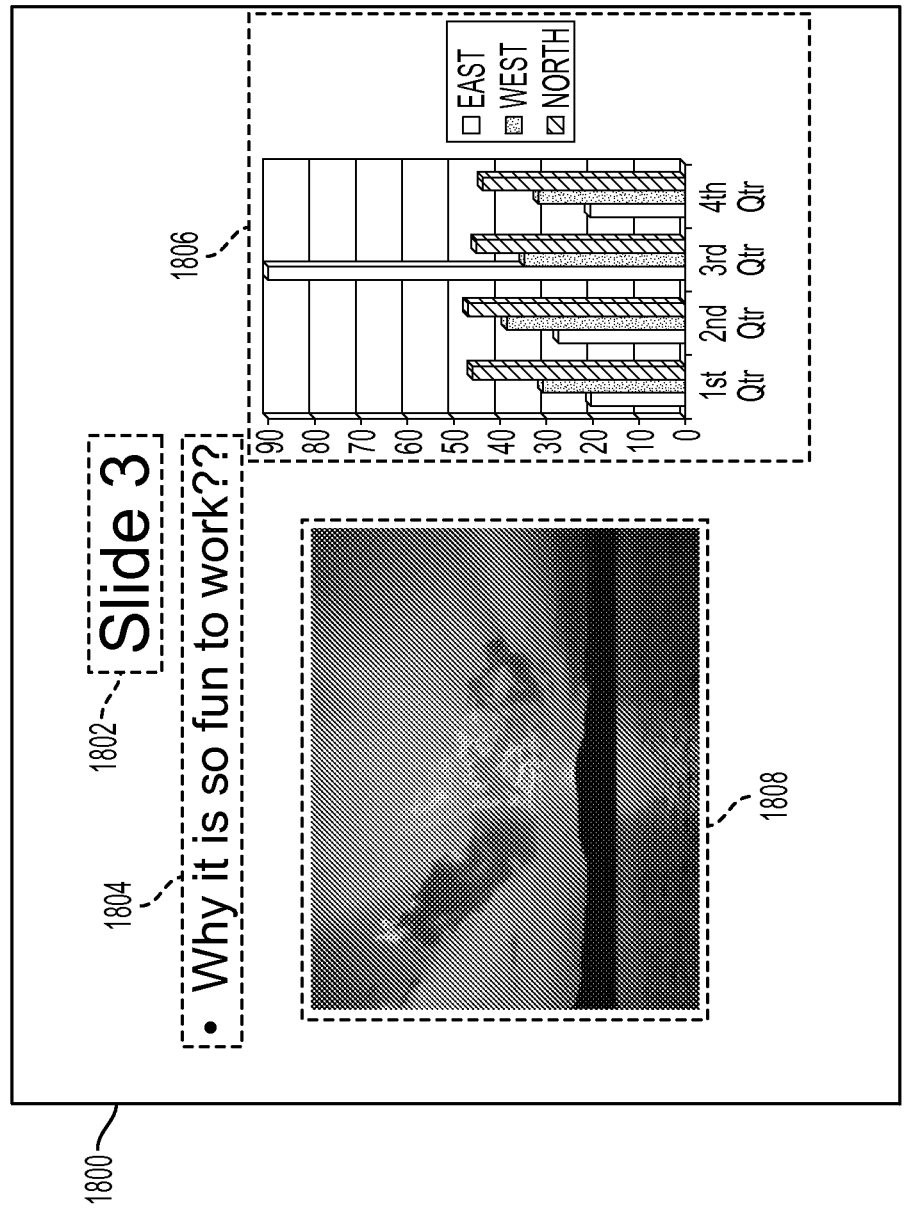
FIG. 18 shows an example original document having no user markings applied thereto.
Figure 19:
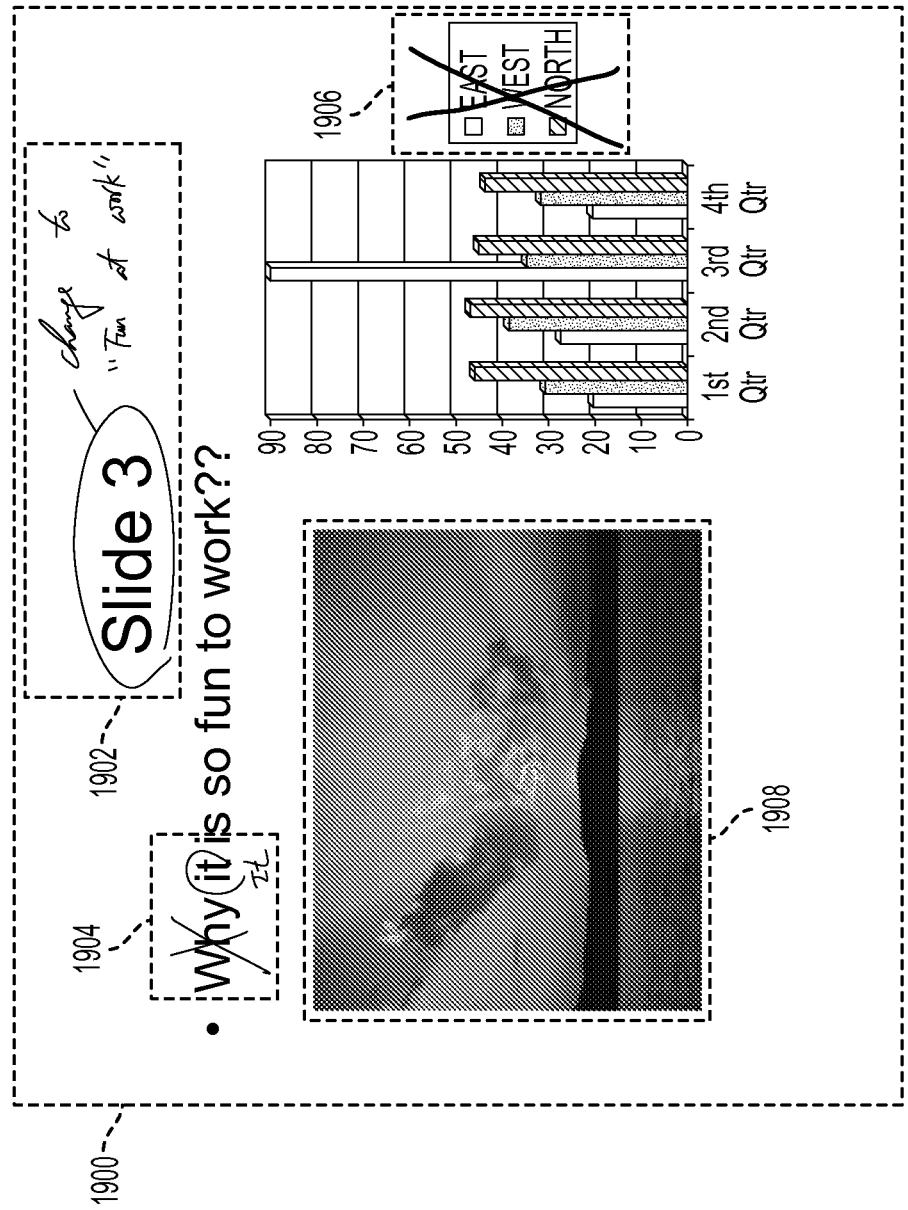
FIG. 19 is a hardcopy print of the original document of FIG. 18 containing a plurality of user markings, the hardcopy print being printed using a print device which induced print defects into the output print.
Figure 20:
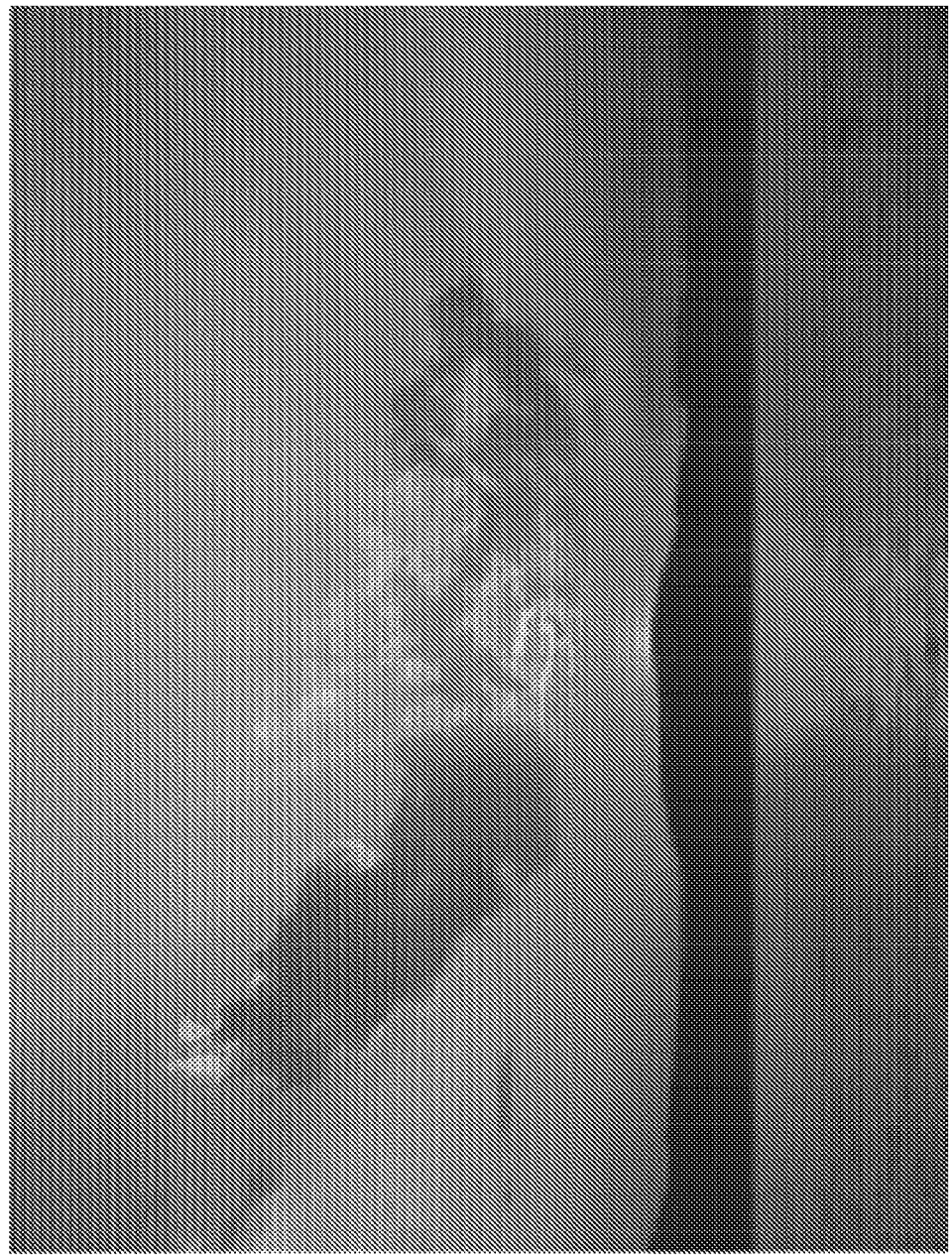
FIG. 20 is an enlarged image of the hardcopy print of FIG. 18 to illustrate banding defects in the image print.

Attention is now directed to FIGS. 18 and 19. FIG. 18 shows an example original document having no user markings applied thereto. The original document contains a plurality of content. Original document 1800 is shown comprising a single page of an example slide presentation created by an author. The example slide page contains a text title ("SLIDE 3") at 1802, a text item ("WHY IT IS SO FUN TO WORK??") at 1804, an example graphic 1806, and an image 1808. FIG. 19 shows the hardcopy print of FIG. 18 whereon a plurality of user markings have been applied. The original document of FIG. 18 was reduced to a hardcopy print using a print device which induced a banding-type print defect into image 1908 which is shown more clearly with respect to the horizontal banding in the image of FIG. 20. Page 1900 contains a first user marking 1902 which indicates that a change to the title is to be made. User marking 1904 indicates that a change is to be made to the bullet item, and user marking 1906 indicates a deletion is to be made to a portion of the example chart. Marked document 1900 also contains image 1908.

Example Flow Diagram of Another Embodiment

Figure 21:
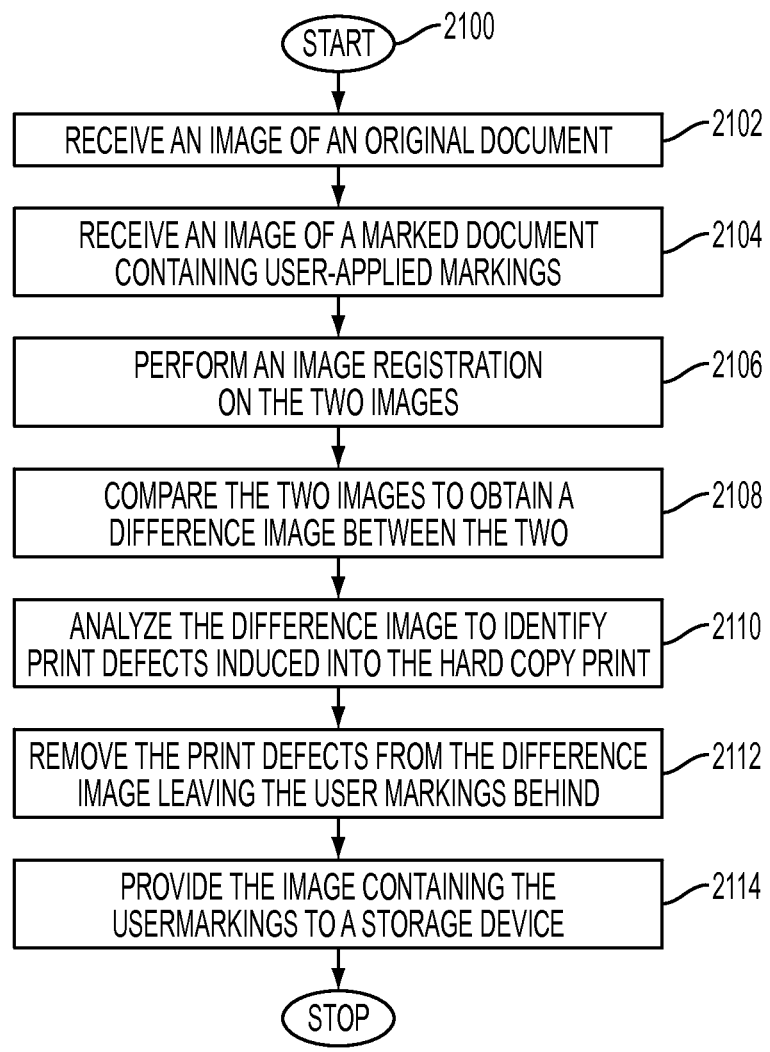
FIG. 21 is a flow diagram of one example embodiment of the present method for identifying and removing print defects from a hardcopy of a marked document in accordance with various embodiments hereof, such that a new composite document can be printed.

Reference is now being made to the flow diagram of FIG. 21 which illustrates one example embodiment of the present method for identifying and removing print defects from a hardcopy of a marked document in accordance with various embodiments hereof, such that a new composite document can be printed. Flow processing starts at 2100 and immediately proceeds to step 2102.

At step 2102, an image of an original document is received. The image of the original document can be received from any of: a storage device, a memory, a computer system, a network, and an image input device. The received original document may be the original document 1800 of FIG. 18, which has been received using image input device 2902 of FIG. 29. In a manner as previously discussed, the original document may be received over example network 608 from a remote device. The original document is unmarked, i.e., no user markings have been applied. The original document may comprise a new composite document generated hereby which, in turn, was reduced to a hardcopy print by an image output device, and which has further print defects and further user markings applied thereto in a second-round of commenting by various consumers of the hardcopy print.

At step 2104, an image of a hardcopy print of the original document is received. In one embodiment, the image of the hardcopy print is received using an image input device such as, for example, a document scanning device. The hardcopy print contains at least one marking which had been applied to the surface thereof by a user. The original document was printed using a print device and digitalized by a sensing device which induce print defects into the hardcopy print 1900 of FIG. 19.

At step 2106, once the image of the hardcopy print of the original document and the image of the original document have been received, an image registration is performed on the two images. Image registration effectuates an alignment between the image of the hardcopy print and the image of the original document.

Figure 22:
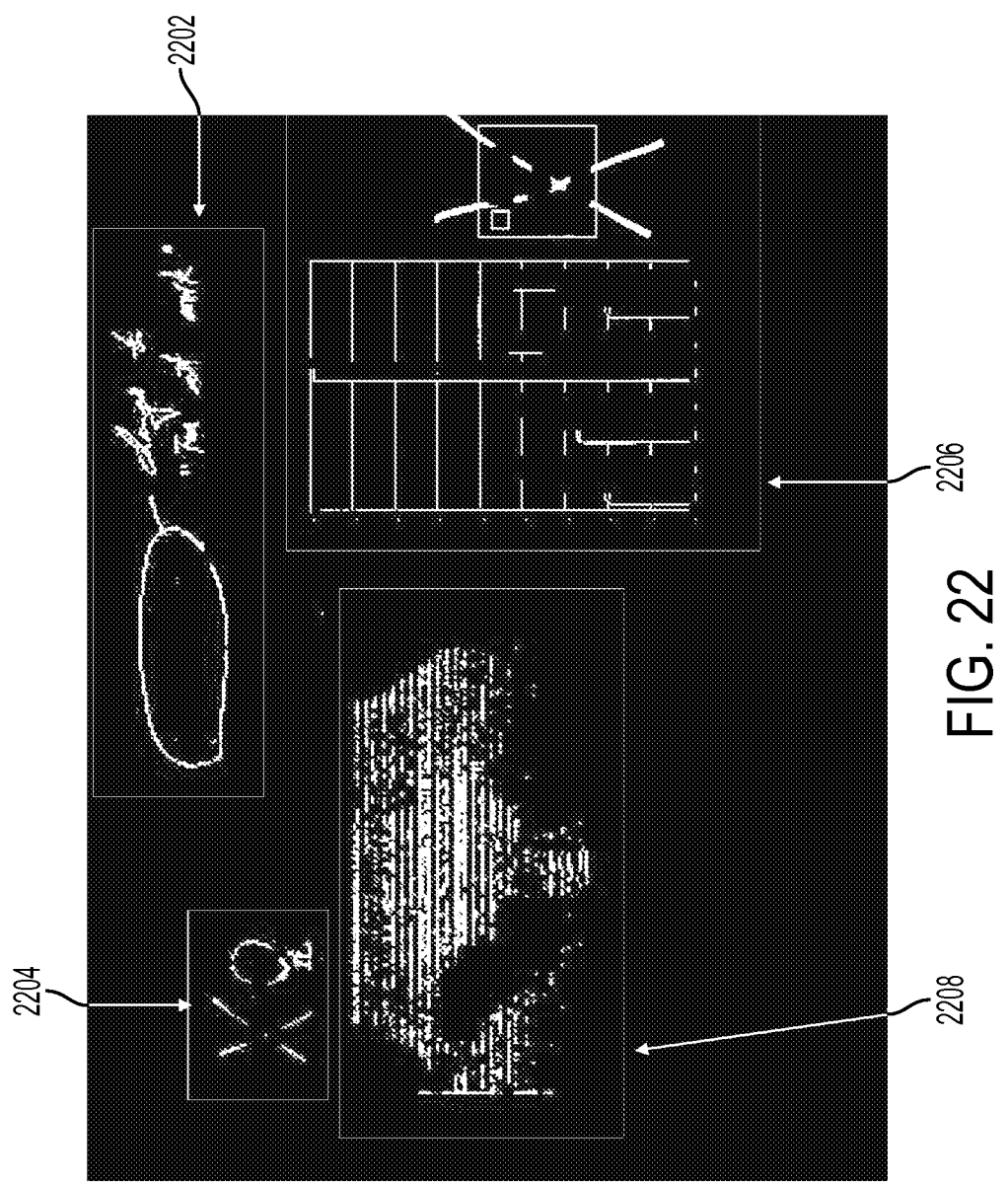
FIG. 22 shows one example difference image obtained from a comparison of the original document of FIG. 18 and the marked document of FIG. 19, the difference image shown containing the user markings of the document of FIG. 19 and the print defect induced into the image of the original document of FIG. 19.

At step 2108, the aligned images are compared such that differences between the two images can be identified from the image of the hardcopy print. Methods for comparing one image from another to produce a difference image (or difference 'bitmap') are well established. One method, for instance, examines the two images and determines differences therebetween on a pixel-by-pixel basis. Pixels in one image which are not found in the other as a result of the comparison produce the difference image. One example difference image is shown in FIG. 22. The difference image of FIG. 22 was obtained, in one embodiment, using a pixel-by-pixel comparison of the original document of FIG. 18 and the marked document of FIG. 19. The difference image contains the user markings along with pixels which were determined to reside in the image of the marked document but were determined to not reside in the image of the original document. The difference image of FIG. 22, contains user markings 2202 and 2204 which correspond to user markings 1902 and 1904, respectively. Further in the difference image of FIG. 22 is shown region 2206 which is a result of imperfect image registration between the two images. Image region 2206 contains user marking 1906 along with a plurality of mislabeled pixels corresponding to the graphical chart 1806 of FIG. 18. Also present in difference image 22 is image region 2208 which, as a result of a pixel-by-pixel comparison between the image 1808 of the original (unprinted) document and the image 1908 of the printed marked document, pixel differences therebetween highlight the induced print defect, as is shown more clearly in the enlarged image of FIG. 20.

At step 2110, the difference image is analyzed to identify print defects induced into the hardcopy print such that the user marking which had been applied to the hardcopy print can be isolated.

Figure 23:
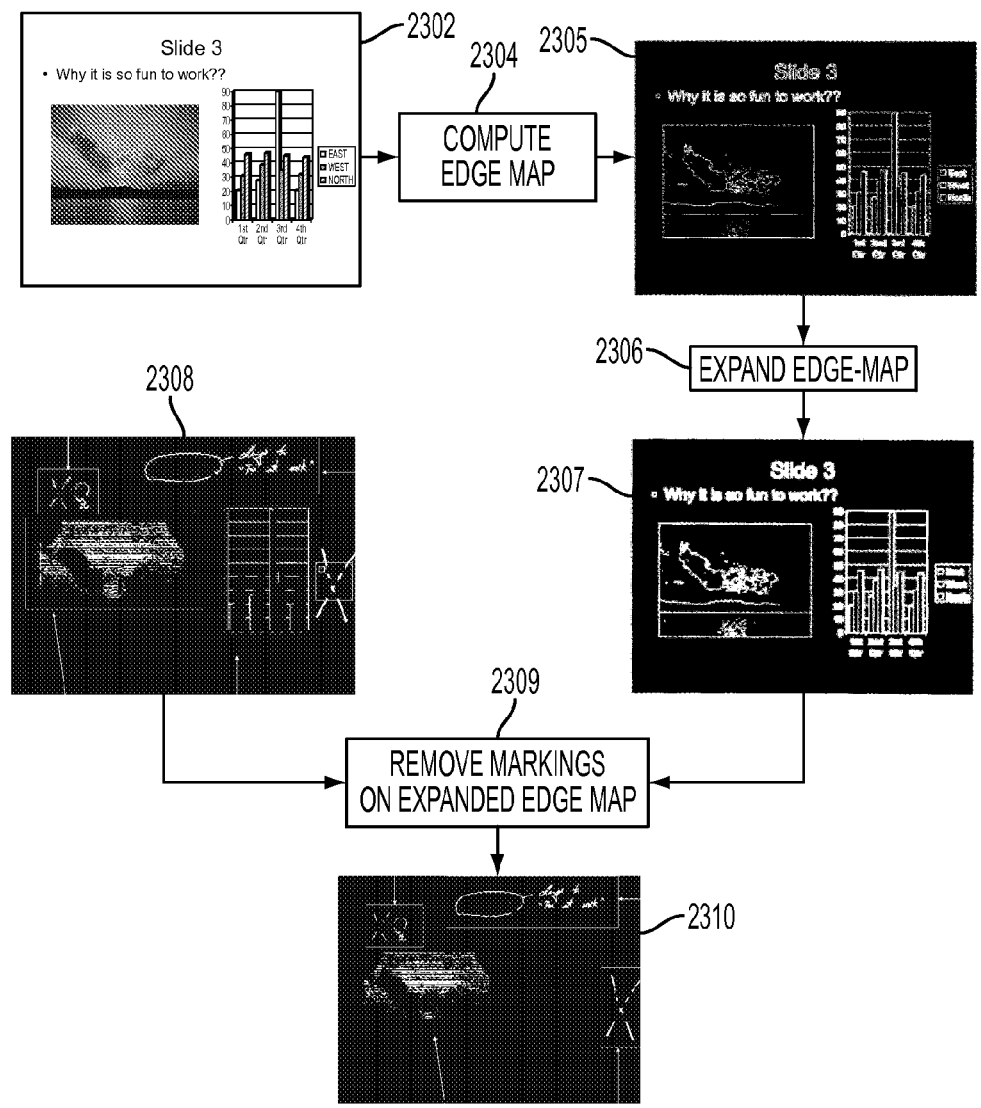
FIG. 23 illustrates one example method for removing false edges (mislabeled pixels) that arise in the difference image as a result of imperfect image registration having been performed to align the image of the original document of FIG. 18 with the image of the marked document of FIG. 19.
Figure 24:
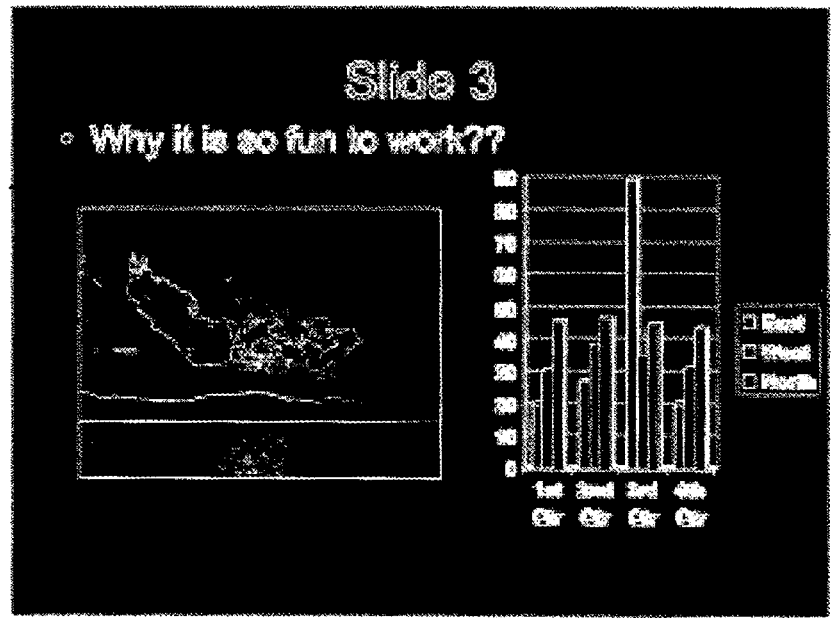
FIG. 24 shows the edge map computed from the image of FIG. 19.
Figure 25:
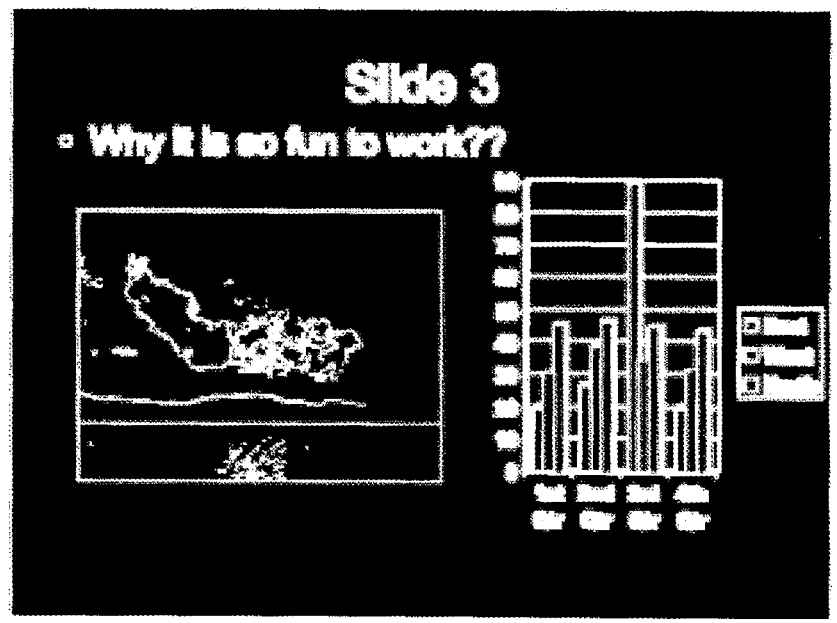
FIG. 25 shows an expanded edge map wherein edges of the edge map of FIG. 24 have been expanded by 1-pixel outward in all 8 direction since the image registration error is within the pixel level.

At step 2112, the identified print defects are removed from the difference image. In one embodiment, expanded edge map masking is used to first remove false edges caused by imperfect image registration having occurred in the image registration step 2106. These false markings can be mistaken as user markings. One such false marking is shown at region 2206 of FIG. 22. Reference is briefly now being made to FIG. 23 to illustrate one example technique for removing false edges. In FIG. 23, an edge map is computed 2304 from the image of the original document 2302. An edge map is produced as a result of a well-known process of edge detection. Edge detection methods can be grouped into essentially two broad categories, i.e., Gradient-based methods and Laplacian Methods. Gradient methods (such as Roberts, Prewitt, Sobel) detect edges by looking for a maximum and a minimum in the first derivative of the image. The Laplacian methods (such as Marrs-Hildreth) searches for zero-crossings in the second derivative of the image and compares the local variance at that point to a threshold. If the threshold is exceeded, an edge is detected. A median filter can be further employed to remove spot noise while preserving the edges. A resulting image is shown in FIG. 24. An edge expansion 2306. In one embodiment using well established techniques, this involves a combination of 2D low-pass filtering on the edge map and thresholding. Here, we expand edges by 1-pixel outward in all 8 directions since the image registration error is within the pixel level using current state of the art image registration algorithms. A result image is shown in expanded edge 2307 shown enlarged in FIG. 25. The expanded edge map 2307 is compared 2309 against the difference image 2308 to exclude any extracted markings that are "on" the edge map. The results of applying this method to the difference image produces image 2310 which is shown enlarged in FIG. 26. As can be seen from a visual examination of the resulting image of FIG. 26, pixels along the detected false edges associated with image region 2206 of FIG. 22 have been removed leaving only the user marking 2606. User markings 2602 and 2604 remain. Portions of the pixels of region 2608 induced by the banding defect remain.

At step 2112, the print defect is removed from the difference image. Removing the print defect from the difference image results in the difference image containing only the user-applied markings. The difference image can be, at this point, considered a marked document and processed by the above-described algorithm as shown in the flow diagram of FIG. 7. Other post-processing steps as described above, where the user markings are removed from the image in the form of objects and stored in a database record along with user-provided information about the objects are readily applicable to the result hereof. For instance, the extracted user markings can be displayed on a user interface, such as that shown in the various illustrated computer systems of the system embodiments hereof, for a user to review. The user can then use the user interface to edit, modify or deleted the user marking. The user interface can be used to select or identify regions of interest, as described with respect to the embodiments of FIGS. 23 and 27. One or more of the user marking can be extracted as an object and provided to one or more additional algorithms such as, for instance, OCR, handwriting recognition, document analysis, vectorization, shape recognition, etc. The user markings can be extracted, identified, labeled, and stored in a manner previously discussed.

In the embodiment of FIG. 21, the resulting image (FIG. 28) containing the user markings is, at step 2014, provided to a storage device for subsequent retrieval. Thereafter, processing stops. One embodiment of a storage device is a database, as are well known in the arts, placed in communication with a computer system, workstation, and/or server, that is either remote from or collocated with a device hosting a computing process that accesses and/or stores documents or images of document. Storage devices include RAM, ROM, Cache Memory, CD-ROM, DVD, flash drives, hard drives, and other volatile or non-volatile storage media. Alternatively, the stored image containing the user marking can be retrieved from the storage device and added into the image of the original document to generate an image of a new marked document which can then be printed or otherwise communicated to other consumer's of this document.

Figure 26:
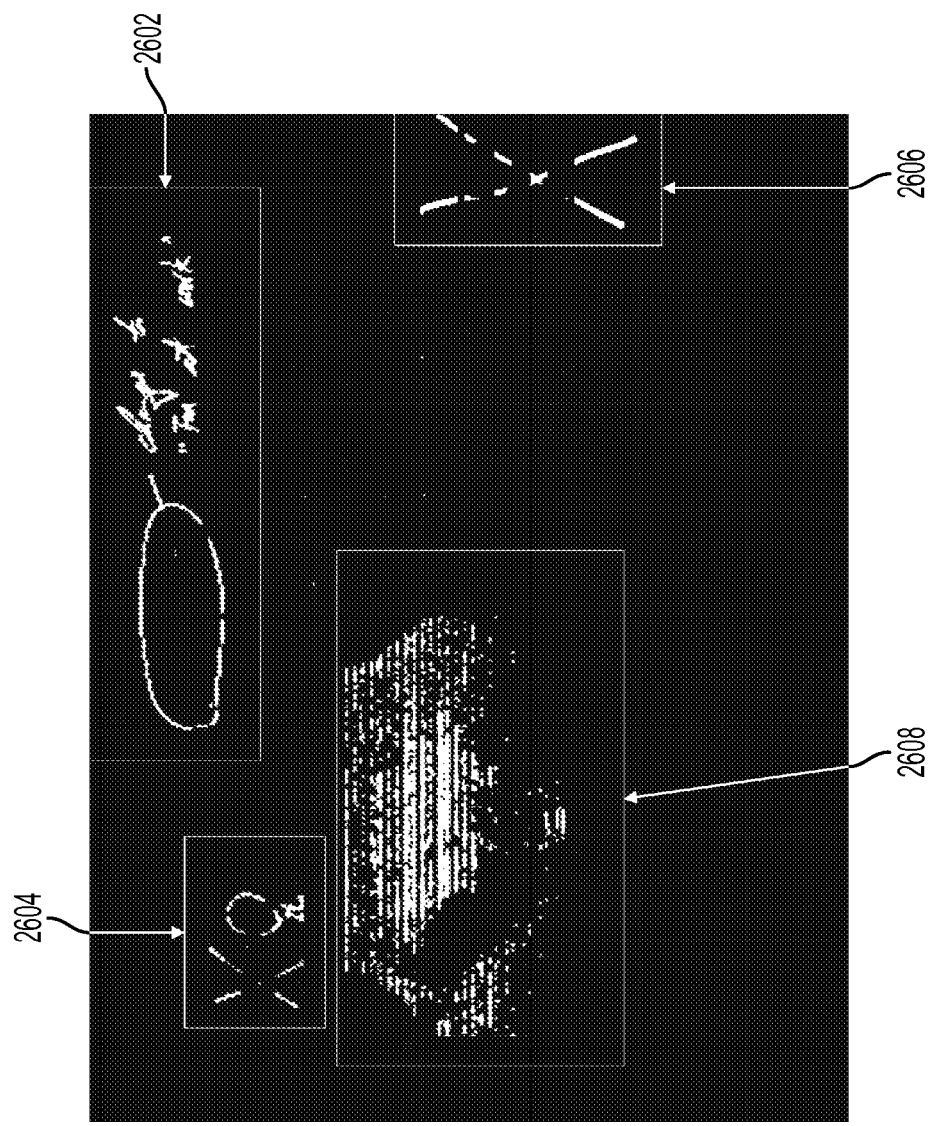
FIG. 26 shows a result image of the expanded edge map of FIG. 25 having been compared against the difference image of FIG. 22 such that any false extracted markings on the edge map are excluded.
Figure 27:
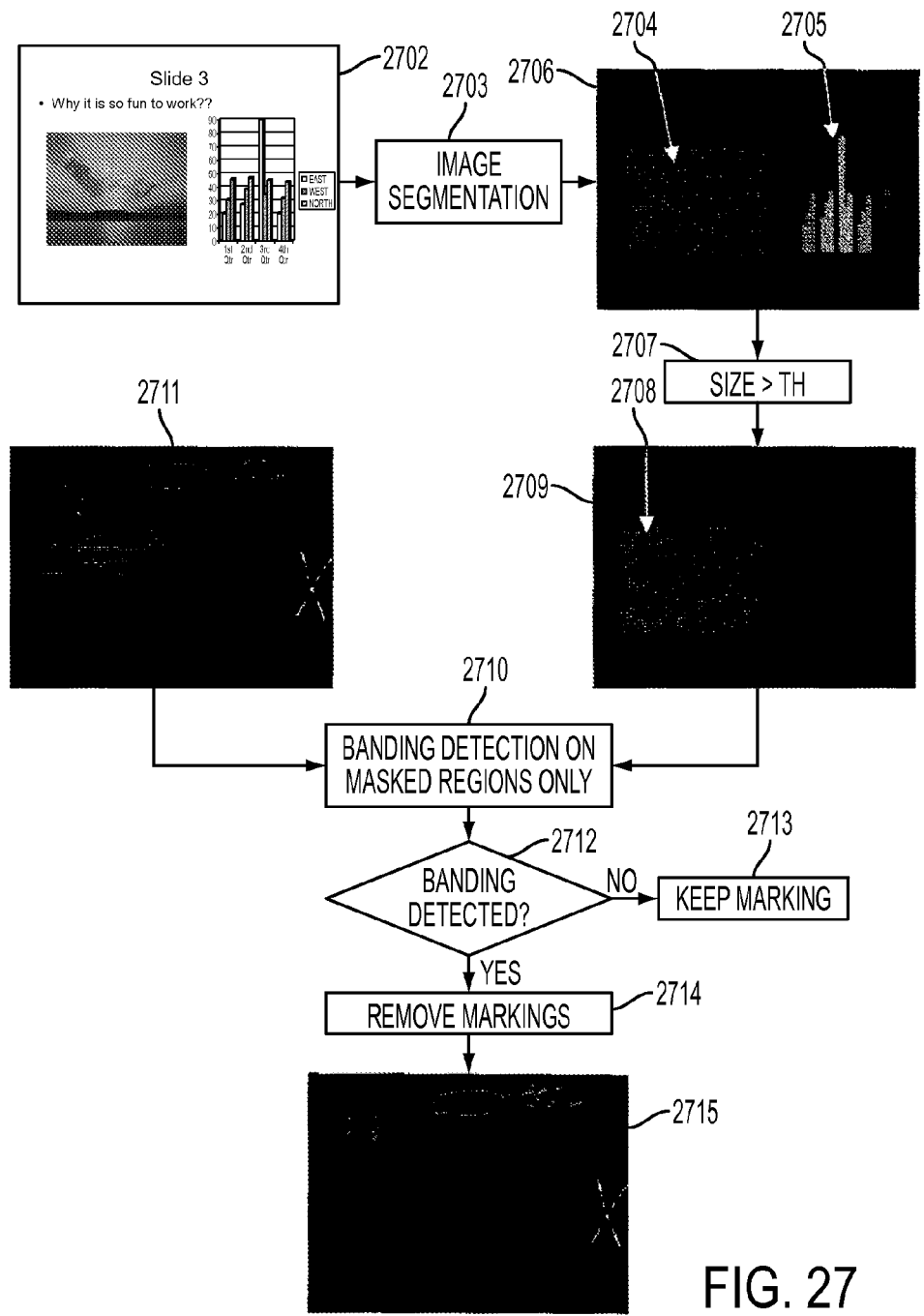
FIG. 27 is an example embodiment of which uses a print defect classification to remove the print defects remaining in region 2608 of the resulting image of FIG. 26.

Reference is now briefly being made to FIG. 27 which uses a print defect classification to remove the print defects remaining in region 2608 of the resulting image of FIG. 26. In FIG. 27, an image segmentation 2703 is performed, for example, on the image of (noise free) original document 2702 rather than a scan of the hardcopy marked document. Image segmentation break images into various contiguous regions that are suitable for banding detection. Image segmentation involves partitioning the digital image into multiple segments that collectively cover the image. Clustering methods employ an iterative K-means algorithm to partition the image into K clusters. In a cluster method, K cluster centers are selected either randomly or based on a heuristic. Each pixel in the image is assigned to the cluster that minimizes a variance between the pixel and the cluster center. Typically, the variance is the squared or absolute difference between a pixel and a cluster center. The cluster centers are re-computed by averaging all of the pixels in the cluster and these steps are repeated until a convergence is attained (e.g. no pixels change clusters). The difference is typically based on pixel color, intensity, texture, pixel location, or a weighted combination of these. This algorithm is guaranteed to converge but it may not return an optimal solution.

In another method, a label is assigned to every pixel in the image such that pixels with the same label share certain characteristics. Each pixel in a similar region is similar with respect to some characteristic or property, such as close proximity, color, intensity, or texture. Adjacent regions tend to be different with respect to these same characteristic(s). Algorithms and techniques have been developed for image segmentation. One example image segmentation technique is described in the above-referenced text: "Computer and Robot Vision".

Figure 28:
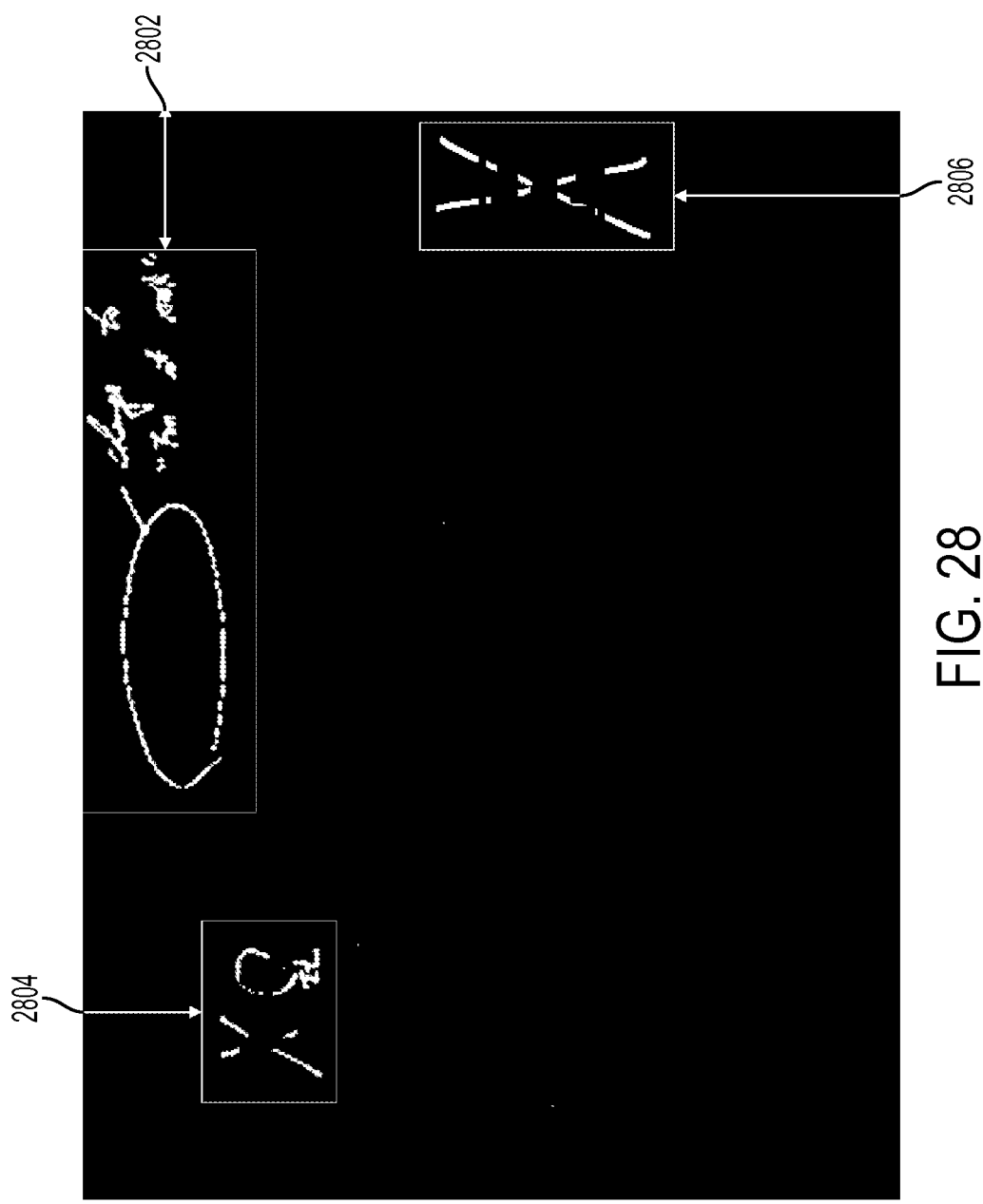
FIG. 28 shows the resulting image of the process of the embodiment of FIG. 27 wherein the user markings are retained as a result of the print defects having been removed from the result image of FIG. 26.

In the embodiment of FIG. 27, image segmentation was performed on the (noise free) digital original (noise-free) rather than the scans. In the example of FIG. 27, two regions 2704 and 2705 are identified in the resulting image 2706. A thresholding 2707 is applied. Only regions that are large enough (i.e., above threshold) where banding is visible and where banding detection is more reliable are retained. In this example, only one region, i.e., the regions of image 1908 of FIG. 19, is retained. The retained 'mask' region is shown at 2708 in image 2709. The mask, which identifies the region of interest for banding detection, is then used to guide where the banding detection will be applied (at 2710) to the image 2711, which corresponds to the image of FIG. 26. 1-D projecting of each scanner channel of the region can be first calculated and then a Fourier analysis applied to the resulting 1-D profile to determine whether any amplitude of frequency components exceed the threshold. If yes, then it is likely that a banding defect is present in that region (the detected banding amplitude being a measure of the likelihood). When defect is detected with high probability (at 2712), either remove the markings previously detected in this region (at 2714) or keep the marking (at 2713). Alternatively, a user can be queried to confirm whether to keep or remove the detected defect. The resulting image of the process of the embodiment of FIG. 27 is shown in FIG. 28 wherein user marking 2802 (corresponding to user marking 1902 of FIG. 19), user marking 2804 (corresponding to user marking 1904), and user marking 2806 (corresponding to user marking 1906) have been retained. It should be appreciated that, although the above embodiments have been discussed with respect to detecting and removing a banding defect induced into the image by a defective print device, the appended claims are intended to encompass embodiments wherein the print defect is a mottle, streaking, graininess, spots, deletion, or moiré, etc.

Example System for Preserving User Markings

Figure 29:
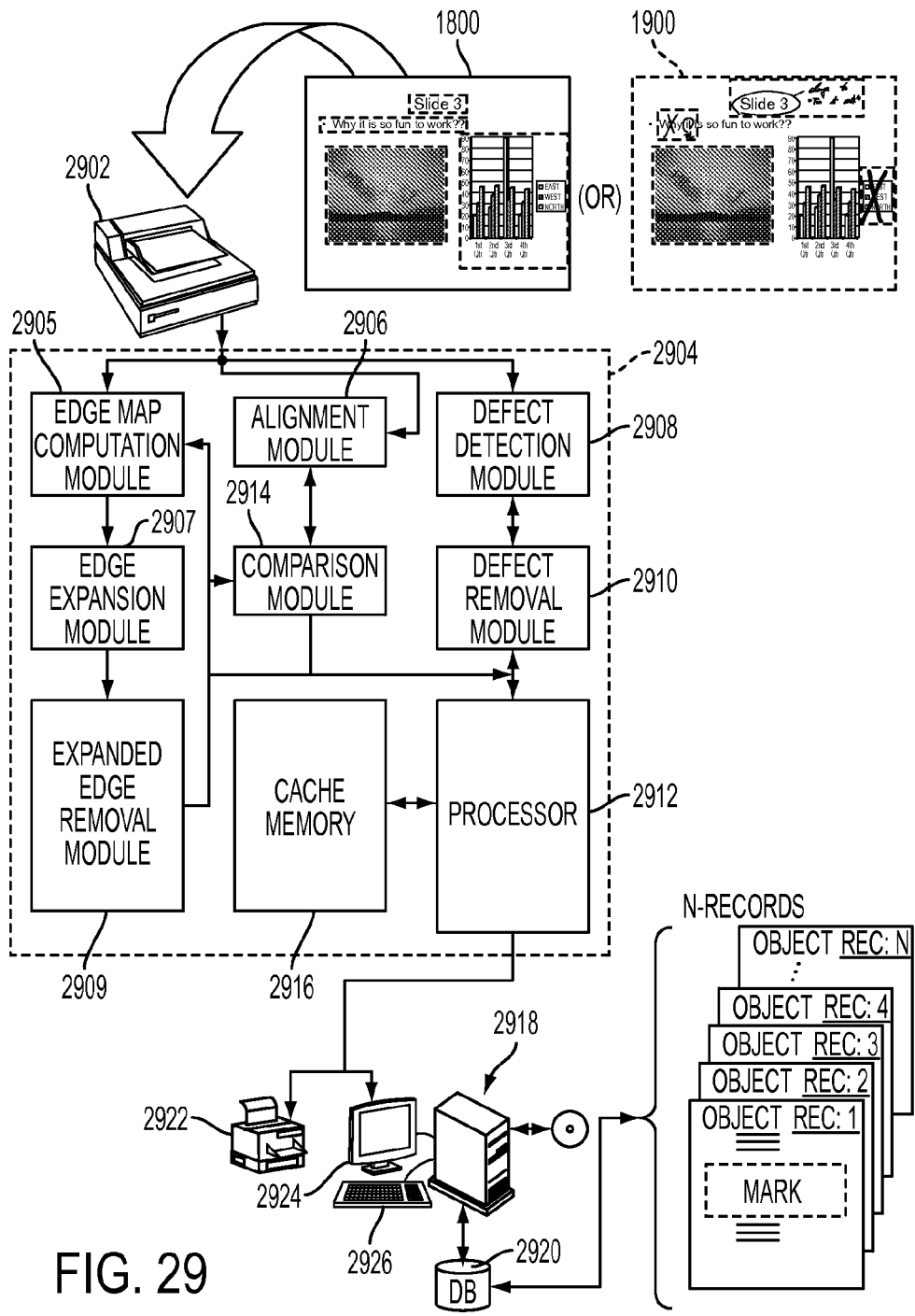
FIG. 29 illustrates one example system for performing various aspects of the present method for preserving user markings applied to a hardcopy print of an original document as described in the flow diagram of FIG. 21 and the embodiments of FIGS. 23 and 27.

Reference is next being made to FIG. 29 which illustrates one example system for performing various aspects of the present method for preserving user markings applied to a hardcopy print of an original document as described in the flow diagram of FIG. 21 and the embodiments of FIGS. 23 and 27.

An example original document, such as original document 1800, and an example marked document, such as marked document 1900 containing a user marking, are scanned using image input device 2902 to obtain an image of each of the original document and marked document. The respective document images are provided to document analysis and processing module 2904. Such a module can be a computer workstation configured to perform various aspects of any of the above-described embodiments, or may be a dedicated system, such as an ASIC or software system similarly configured. The image of the original document and the image of the scanned at least one marked document are provided to alignment module 2906 wherein, in one embodiment, an image registration is performed on the received images such that a common orientation and magnification is achieved therebetween. An output of the alignment module 2906 comprises a bitmap of one document image overlaid on a bitmap of the other document image such that a pixel by pixel comparison can be effectuated. An output of the alignment module is provided to comparison module 2914 wherein the overlaid images are compared, pixel-by-pixel, to obtain a bitmap of pixels which are found to reside in the image of the marked document but not within the image of the original document. The comparison module produces a bitmap of such difference pixels. In this embodiment, the bitmap comprises the difference image discussed with respect to the embodiments of FIGS. 18-29. One example difference image bitmap is shown and discussed with respect to the bitmap of FIG. 22. Edge map computation module 2905 effectuates a computation discussed with respect to computation module 2304 which generates the edge map shown and discussed with respect to the edge map 2305 of FIG. 23. Edge expansion module 2907 effectuates an expansion of edge map 2305 in a manner as discussed with respect to module 2306 to produce the edge map 2307 of FIG. 23. Expanded edge removal module 2909 effectuates a removal of edges via a comparison as shown at 2309 of FIG. 23 to produce image 2310. Likewise, print defect detection module 2908 effectuates the image segmentation 2703 and the thresholding 2707 of FIG. 27. Print defect removal module 2910 effectuates, for example, the banding detection of masked regions 2710 and the embodiments shown and discussed with respect to 2712, 2713, and 2714 of FIG. 27 to produce the image 2715. Processor 2912 helps facilitate the functions performed and provides cache memory and processing throughput to the between the various modules. In other embodiments, processor 2912 executes a plurality of machine readable program instructions stored in cache memory 2916 for performing various aspects of any of the functionality of any of the modules shown in system 2904 and discussed with respect to the flow diagram of FIG. 21. Processor 2904 is in further communication with computer system 2918 wherein, in various previously discussed embodiments, extracted objects and/or the bitmap difference images containing the user markings are further processed in accordance herewith. In one embodiment, the objects and/or the received bitmap are stored to storage device 2920. In another, the objects and/or the bitmap are provided to image output device 2922 or displayed on display device 2924. In various embodiments, the user enters identification information using keyboard 2926 for any of the extracted embedded objects and/or any of the bitmap image. Any identification information may be automatically generated without a user input. Such identification information for one example record is shown and discussed with respect to FIG. 13.

It should be appreciated that a "module" or "unit", as shown and described with respect to the embodiments of FIGS. 23, 27, and 29, designates a system component comprised of software or hardware, or a combination of both which is designed to perform a given function. A plurality of modules may collectively perform a given function. A module may be implemented using a single software program comprising, at least in part, machine readable program instruction, or a single piece of hardware such as an ASIC, electronic circuit, or special purpose processing system such as is shown and discussed with respect to the embodiment of FIG. 30. A plurality of modules may be executed by either a single computer system or a plurality of computer systems operating in parallel. Connections between modules (or "units") include both physical and logical connections. A system includes one or more software and/or hardware modules which may further comprise an operating system, drivers, device controllers, and other apparatuses some or all of which may be connected via a network.

It should be appreciated that various aspects of the methods described herein will find their intended uses in a wide variety of digital imaging system. The set of digital imaging systems to which the present method is directed includes monochrome or color digital document reproduction architectures, document scanning systems, a wide variety of printers/copiers, book/magazine/newspaper, digital printing presses, and other multi-function document reproduction systems. Such systems generally include a display device such as a CRT or touch screen along with one or more user interfaces such as a keyboard, mouse, keypad, touchpad, and the like, for entering data and configuring device-specific settings to optimize image quality and performance. Such complex devices further incorporate an image processing or color management system for processing image data. The image processing system can be a hardware or software construction which preferably resides in the image path of the device. It should also be understood that one or more functions, features, or capabilities performed by a computer system or special purpose processor (such as an ASIC) performing one or more aspects of the present banding defect detection and trend analysis method, as described more fully herein, may be integrated, in whole or in part, with any system or sub-system of such a digital imaging system.

Example Special Purpose Computer

Figure 30:
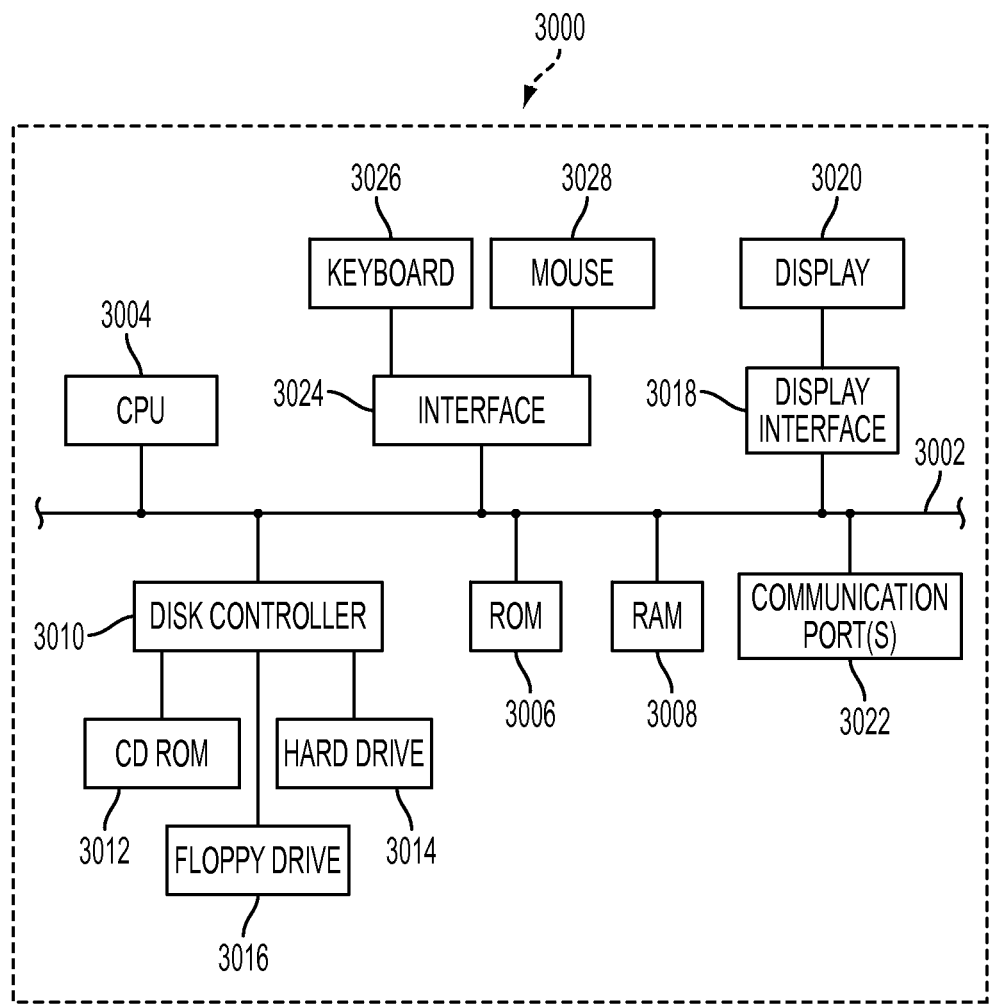
FIG. 30 illustrates a block diagram of one example embodiment of a special purpose computer system for implementing one or more aspects of the systems hereof as further described with respect to the various flow diagrams hereof.

Reference is now being made to FIG. 30 which illustrates a block diagram of one example embodiment of a special purpose computer system for implementing one or more aspects of the present method as described with respect to the flow diagrams hereof and the system of FIG. 13. Such a special purpose processor 3000 is capable of executing machine executable program instructions.

In FIG. 30, communications bus 3002 serves as an information highway interconnecting the other illustrated components of special purpose computer system 3000. The special purpose computer incorporates a central processing unit (CPU) 3004 capable of executing machine readable program instructions for performing any of the calculations, comparisons, logical operations, object identifications and extractions, user marking identifications and extractions, and other program instructions for performing the methods described above with respect to the flow diagrams and illustrated embodiments hereof. The CPU is in communication with Read Only Memory (ROM) 3006 and Random Access Memory (RAM) 3008 which, collectively, constitute example memory storage devices. Such memory may be used to store machine readable program instructions and other program data and results to sufficient to carry out any of the functionality described herein.

Disk controller 3010 interfaces with one or more storage devices 3014. These storage devices may comprise external memory, zip drives, flash memory, USB drives, memory sticks, or other storage devices with removable media such as CD-ROM drive 3012 and floppy drive 3016. Machine executable program instructions for executing the methods hereof or for performing any of the functionality show with respect to the system embodiments of FIG. 14, for example. Any of the document images and bitmaps may also be stored on any of these storage devices. Such storage devices may be used to implement a database wherein various records of objects and user markings, such as those illustrated in FIG. 13, are stored for subsequent retrieval. Example computer readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. The computer readable medium may additionally comprise computer readable information in a transitory state medium such as a network link and/or a network interface, including a wired network or a wireless network, which allows the computer system to read such computer readable information. Computer programs (also called computer control logic) may be stored in a main memory and/or a secondary memory. Computer programs may also be received via the communications interface. The computer readable medium is further capable of storing data, machine instructions, message packets, or other machine readable information, and may include non-volatile memory. Such computer programs, when executed, enable the computer system to perform one or more aspects of the methods provided herein.

Display interface 3018 effectuates the display of information on display device 3020 in various formats such as, for instance, audio, graphic, text, and the like. Interface 3024 effectuates a communication via keyboard 3026 and mouse 3028. Such a graphical user interface is useful for a user to review any of the identified objects and/or user markings and for entering object identification information about any of the displayed information in accordance with various embodiments hereof.

Communication with external devices may occur using example communication port(s) 3022. Such ports may be placed in communication with any of the example networks shown and described herein, such as the Internet or an intranet, either by direct (wired) link or wireless link. Example communication ports include modems, network cards such as an Ethernet card, routers, a PCMCIA slot and card, USB ports, and the like, capable of transferring data from one device to another. Software and data transferred via any of the communication ports 3022 are in the form of signals which may be any of digital, analog, electromagnetic, optical, infrared, or other signals capable of being transmitted and/or received by the communications interface. Such signals may be implemented using, for example, a wire, cable, fiber optic, phone line, cellular link, RF, or other signal transmission means presently known in the arts or which have been subsequently developed.

One or more aspects of the methods described herein are intended to be incorporated in an article of manufacture, including one or more computer program products, having computer usable or machine readable media. The article of manufacture may be included on at least one storage device readable by machine architectures or other xerographic or image processing systems embodying executable program instructions capable of performing one or more aspects of the present method, as described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A computer implemented method for preserving markings made to a hardcopy of an original document, the method comprising:
   receiving an image of an original document;
   extracting one or more embedded objects within the original document to create a first list of objects embedded in the original document, the embedded objects being separable content that includes at least one of text, graphics, pictures, plots, user markings, and line art;
   receiving, using a scanning device, an image of a hardcopy print of the original document, the hardcopy print containing a user marking;
   extracting one or more embedded objects in the image of the hardcopy print to create a second list of objects embedded in the image of the hardcopy print, the embedded objects being separable content that includes at least one of text, graphics, pictures, plots, user markings, and line art;
   comparing the first list to the second list in order to identify differences between the original image and the image of the hardcopy print;
   extracting the identified differences from the image of the hardcopy print to produce a difference image;
   analyzing the difference image to identify a print defect;
   removing the print defect from the difference image to retrieve the user marking; and
   generating an object identification record comprising a plurality of data fields containing information about the user marking and information which enables the identified differences to be associated with a particular location within a given page of the original document.

2. The method of claim 1, wherein, in advance of comparing the image of the hardcopy print against the image of the original document, further comprising performing an image registration between the image of the hardcopy print and the image of the original document to obtain an alignment between the original image and the image of the hardcopy print.

3. The method of claim 1, wherein identifying the print defect comprises:
   identifying suspected print defects in a print device used to produce the hardcopy print of the original document;
   classifying the suspected print defects based upon defect type; and
   using a print defect classification to differentiate the user marking from the print defect in the difference image.

4. The method of claim 1, wherein in advance of analyzing the difference image to identify the print defect further comprises:

generating an expanded edge map from the difference image; and comparing the expanded edge map with the image of the original document to identify mislabeled edge pixels; and removing the mislabeled edge pixels from the difference image.

5. The method of claim 1, wherein identifying the print defect comprises a banding defect detection.

6. The method of claim 1, further comprising adding the user marking into the image of the original document to generate an image of a new marked document containing the user marking.

7. The method of claim 6, further comprising printing the generated new marked document containing the user marking.

8. The method of claim 1, further comprising:
displaying the user marking on a user interface; and
using the user interface to perform any of: modifying the user marking, and converting the user marking to a text or vector graphic format.

9. A system for preserving markings made to a hardcopy of an original document, said system comprising:
a memory;
a storage medium for storing data; and
a processor in communication with said storage medium and said memory, said processor executing machine readable instructions for performing the method of:
receiving an image of an original document;
extracting one or more embedded objects within the original document to create a first list of objects embedded in the original document, the embedded objects being separable content that includes at least one of text, graphics, pictures, plots, user markings, and line art;
receiving, using a scanning device, an image of a hardcopy print of the original document, the hardcopy print containing a user marking;
extracting one or more embedded objects in the image of the hardcopy print to create a second list of objects embedded in the image of the hardcopy print, the embedded objects being separable content that includes at least one of text, graphics, pictures, plots, user markings, and line art;
comparing the first list to the second list in order to identify differences between the original image and the image of the hardcopy print;
extracting the identified differences from the image of the hardcopy print to produce a difference image;
analyzing the difference image to identify a print defect;
removing the print defect from the difference image to retrieve the user marking; and
generating an object identification record comprising a plurality of data fields containing information about the user marking and information which enables the identified differences to be associated with a particular location within a given page of the original document.

10. The system of claim 9, wherein, in advance of comparing the image of the hardcopy print against the image of the original document, further comprising performing an image registration between the image of the hardcopy print and the image of the original document to obtain an alignment between the original image and the image of the hardcopy print.

11. The system of claim 9, wherein identifying the print defect comprises:

identifying suspected print defects in a print device used to produce the hardcopy print of the original document;
classifying the suspected print defects based upon defect type; and
using a print defect classification to differentiate the user marking from the print defect in the difference image.

12. The system of claim 9, wherein in advance of analyzing the difference image to identify the print defect further comprises:
generating an expanded edge map from the difference image; and
comparing the expanded edge map with the image of the original document to identify mislabeled edge pixels; and
removing the mislabeled edge pixels from the difference image.

13. The system of claim 9, wherein identifying the print defect comprises a banding defect detection.

14. The system of claim 9, further comprising adding the user marking into the image of the original document to generate an image of a new marked document containing the user marking.

15. The system of claim 14, further comprising printing the generated new marked document containing the user marking.

16. The system of claim 9, further comprising:
displaying the user marking on a user interface; and
using the user interface to perform any of: modifying the user marking, and converting the user marking to a text or vector graphic format.

17. A computer implemented method for preserving markings made to a hardcopy of an original document, the method comprising:
receiving an image of an original document;
extracting one or more embedded objects within the original document to create a first list of objects embedded in the original document, the embedded objects being separable content that includes at least one of text, graphics, pictures, plots, user markings, and line art;
receiving, using a scanning device, an image of a hardcopy print of the original document, the hardcopy print containing a user marking, the original document having been printed using a print device which caused a print defect in the hardcopy print;
extracting one or more embedded objects in the image of the hardcopy print to create a second list of objects embedded in the image of the hardcopy print, the embedded objects being separable content that includes at least one of text, graphics, pictures, plots, user markings, and line art;
comparing the first list to the second list in order to identify differences between the original image and the image of the hardcopy print;
extracting the identified differences from the image of the hardcopy print to produce a difference image;
generating an expanded edge map from the difference image; and
comparing the expanded edge map with the image of the original document to identify mislabeled edge pixels;
removing the mislabeled edge pixels from the difference image;
analyzing the difference image to identify a print defect;
removing the print defect from the difference image to retrieve the user marking which had been applied to the hardcopy print;
generating an object identification record comprising a plurality of data fields containing information about the user marking and information which enables the identified differences to be associated with a particular location within a given page of the original document; and, adding the user marking into the image of the original document to generate an image of a new marked document containing the user marking.

18. The method of claim 17, wherein identifying the print defect comprises:

identifying suspected print defects in a print device used to produce the hardcopy print of the original document;

classifying the suspected print defects based upon defect type; and using a print defect classification to differentiate the user marking from the print defect in the difference image.

19. The method of claim 17, further comprising:

displaying the user marking on a user interface; and using the user interface to perform any of: modifying the user marking, and converting the user marking to a text or vector graphic format.

20. The method of claim 17, further comprising storing the user marking to a storage device.

\* \* \* \* \*